(12) United States Patent
Ishii et al.

(10) Patent No.: US 10,838,066 B2
(45) Date of Patent: Nov. 17, 2020

(54) SOLID-STATE IMAGING DEVICE, DISTANCE MEASUREMENT DEVICE, AND DISTANCE MEASUREMENT METHOD

(71) Applicant: Panasonic Intellectual Property Management Co., Ltd., Osaka (JP)

(72) Inventors: Motonori Ishii, Osaka (JP); Shinzo Koyama, Osaka (JP); Masato Takemoto, Osaka (JP); Shigeru Saitou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 15/968,918

(22) Filed: May 2, 2018

(65) Prior Publication Data

US 2018/0246214 A1    Aug. 30, 2018

Related U.S. Application Data

(63) Continuation of application No. PCT/JP2016/005075, filed on Dec. 7, 2016.

(30) Foreign Application Priority Data

Dec. 8, 2015 (JP) .................. 2015-239763
Feb. 17, 2016 (JP) .................. 2016-028428

(51) Int. Cl.
*G01S 17/89* (2020.01)
*G01S 7/487* (2006.01)
(Continued)

(52) U.S. Cl.
CPC .............. *G01S 17/89* (2013.01); *G01S 7/481* (2013.01); *G01S 7/487* (2013.01); *G01S 7/4861* (2013.01);
(Continued)

(58) Field of Classification Search
CPC combination set(s) only.
See application file for complete search history.

(56) References Cited

U.S. PATENT DOCUMENTS 10,422,879 B2 *  9/2019  Nagai ................. G01S 17/36
2004/0070748 A1    4/2004  Inaba et al.
(Continued)

FOREIGN PATENT DOCUMENTS

JP    2002-328169 A    11/2002
JP    2004-294420 A    10/2004
(Continued)

OTHER PUBLICATIONS

International Search Report issued in Application No. PCT/JP2016/005075 dated Mar. 7, 2017, with English translation.
(Continued)

*Primary Examiner* — Janese Duley
(74) *Attorney, Agent, or Firm* — McDermott Will & Emery LLP

(57) ABSTRACT

A plurality of pixels in a solid-state imaging device each include: a light receiving circuit that includes a light receiving element performing photoelectric conversion, sets, by an exposure signal, a photoelectric time for performing the photoelectric conversion, and outputs a light reception signal depending on whether or not incident light has reached the pixel within the photoelectric time; a counter circuit that counts, as a count value, the number of times the incident light has reached the pixel, based on the light reception signal; a comparison circuit that sets a value corresponding to the count value as a threshold, and sets a comparison signal to an on state in the case where the count value is greater than the threshold; and a storage circuit that stores, as a distance signal, a time signal when the comparison signal is in the on state.

14 Claims, 18 Drawing Sheets

(51) Int. Cl.
  G01S 7/481    (2006.01)
  H04N 5/3745   (2011.01)
  H04N 9/04     (2006.01)
  G01S 7/4863   (2020.01)
  G01S 7/4861   (2020.01)
  G01S 17/10    (2020.01)
  H04N 5/33     (2006.01)
  H04N 5/357    (2011.01)

(52) U.S. Cl.
  CPC ............ *G01S 7/4863* (2013.01); *G01S 17/10* (2013.01); *H04N 5/332* (2013.01); *H04N 5/3575* (2013.01); *H04N 5/37452* (2013.01); *H04N 5/37457* (2013.01); *H04N 9/04553* (2018.08)

(56) References Cited

U.S. PATENT DOCUMENTS

| | | |
|---|---|---|
| 2005/0231709 A1 | 10/2005 | Inaba et al. |
| 2006/0192938 A1 | 8/2006 | Kawahito |
| 2010/0020209 A1 | 1/2010 | Kim |
| 2011/0157354 A1 | 6/2011 | Kawahito |
| 2011/0249148 A1* | 10/2011 | Prescher ............... G01S 17/023 348/234 |
| 2013/0062522 A1 | 3/2013 | Jiang et al. |
| 2014/0085622 A1 | 3/2014 | Wong |
| 2016/0295193 A1 | 10/2016 | Van Nieuwenhove et al. |

FOREIGN PATENT DOCUMENTS

| | | |
|---|---|---|
| JP | 2010-032425 A | 2/2010 |
| JP | 2010-035168 A | 2/2010 |
| JP | 2010-091378 A | 4/2010 |
| JP | 2011-128024 A | 6/2011 |
| JP | 2012-513694 A | 6/2012 |
| JP | 2014-514733 A | 6/2014 |
| JP | 2015-534068 A | 11/2015 |
| WO | 2015/097284 A1 | 7/2015 |

OTHER PUBLICATIONS

C. Niclass et al., "A 0.18-μm CMOS SoC for a 100-m-Range 10-Frame/s 200×96-Pixel Time-of-Flight Depth Sensor," IEEE Journal of Solid-State Circuits, vol. 49, No. 1, Jan. 2014, pp. 315-330.

C. Niclass et al., "A. 100-m Range 10-Frame/s 340×96-Pixel Time-of-Flight Depth Sensor in 0.18-μm CMOS", IEEE Journal of Solid-State Circuits, vol. 48, No. 2, Feb. 2013, pp. 559-572.

Extended European Search Report issued in Application No. 16872626.3 dated Nov. 12, 2018.

* cited by examiner

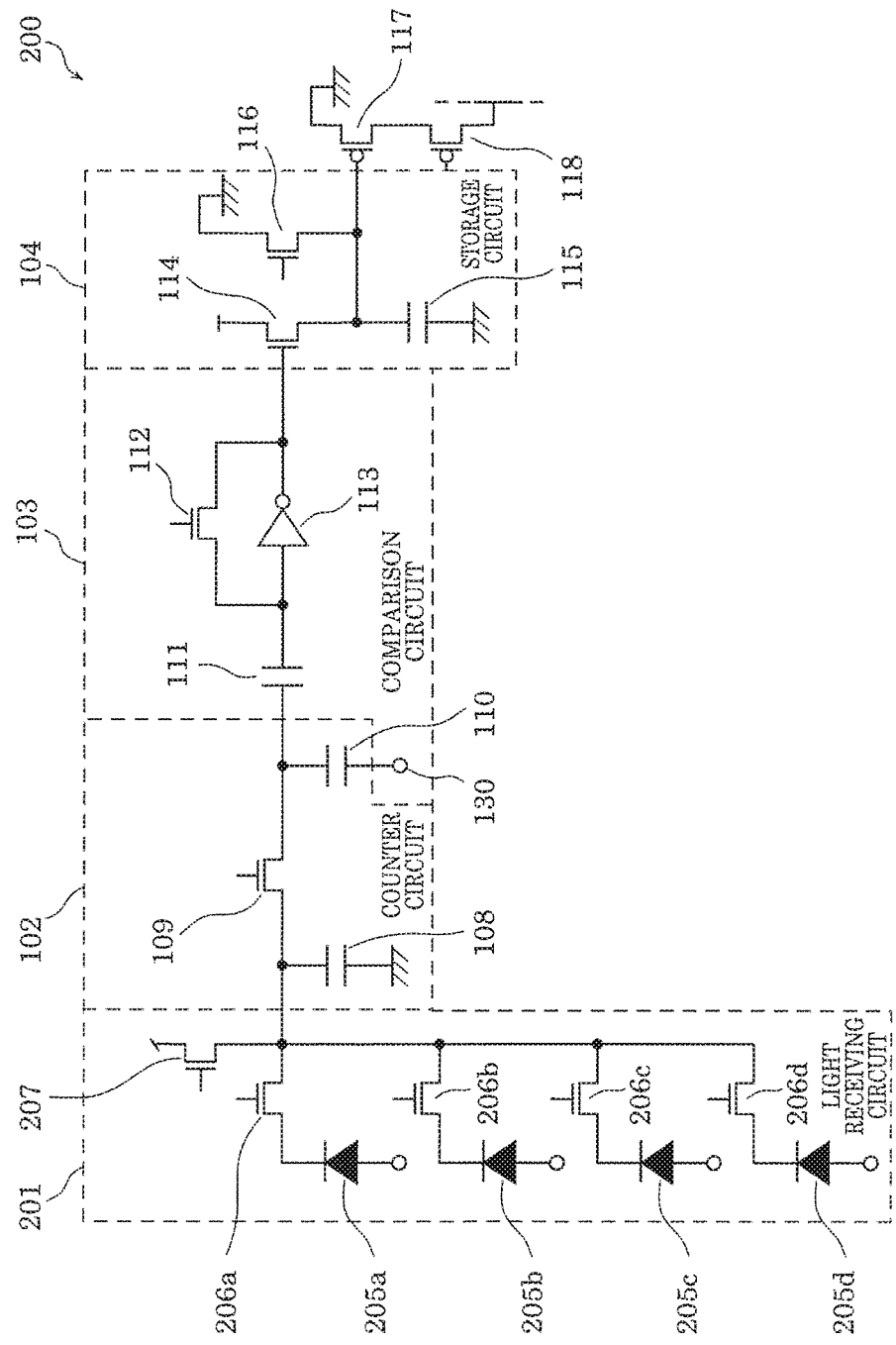

SOLID-STATE IMAGING DEVICE, DISTANCE MEASUREMENT DEVICE, AND DISTANCE MEASUREMENT METHOD

CROSS REFERENCE TO RELATED APPLICATIONS

This application is a U.S. continuation application of PCT International Patent Application Number PCT/JP2016/005075 filed on Dec. 7, 2016, claiming the benefit of priority of Japanese Patent Application Number 2015-239763 filed on Dec. 8, 2015, and Japanese Patent Application Number 2016-028428 filed on Feb. 17, 2016, the entire contents of which are hereby incorporated by reference.

BACKGROUND

1. Technical Field

The present disclosure relates to a solid-state imaging device, a distance measurement device, and a distance measurement method.

2. Description of the Related Art

The development of solid-state imaging devices has conventionally focused on capturing images with high sensitivity and high resolution. Solid-state imaging devices also capable of obtaining information of a distance from the solid-state imaging device have been introduced in recent years. Combining an image with distance information enables detecting three-dimensional information of an imaging object of the solid-state imaging device. For example, when capturing an image of a person, his or her action (gesture) can be detected three-dimensionally. Such a solid-state imaging device can be used as an input device of various types of equipment. Moreover, if the solid-state imaging device is installed in, for example, a vehicle, the distance to each object or person around the vehicle can be recognized. The solid-state imaging device can thus be used for collision avoidance, autonomous driving, and the like.

One of many methods used for measuring the distance from the solid-state imaging device to an object is time of flight (TOF) method that measures the time from when light is applied to the object from the vicinity of the solid-state imaging device to when the light is reflected by the object and returns to the solid-state imaging device. A disadvantage of the method is that a light source is needed in addition to the solid-state imaging device, as compared with other methods such as compound-eye method. An advantage of the method is that even the distance to a far object can be measured with high resolution, by intensifying the light source. A method of obtaining three-dimensional information by applying the TOF method to the solid-state imaging device is, for example, a technique described in Japanese Unexamined Patent Application Publication No. 2004-294420.

SUMMARY

FIG. 14 illustrates a solid-state imaging device disclosed in Japanese Unexamined Patent Application Publication No. 2004-294420. FIG. 15 illustrates a drive sequence of the solid-state imaging device. In the drive sequence diagram in FIG. 15, emitted light has a pulse shape with certain cyclicity. Received light (light pulse reflected from an object) reaches the solid-state imaging device with delay time Td corresponding to the distance to the object, with respect to the emitted light (light pulse emitted from a light source). Charge generated in response to the received light incident on a light receiving element, i.e. a photodiode (PD), is divided between two nodes according to the driving of two transfer gate transistors TX1 and TX2, to generate signals A and B. After this, the same driving is performed in a state where the emitted light is turned off, to obtain signals C and D. Signals A and B contain a background light component. By subtracting signals C and D from signals A and B to yield signals (A–C) and (B–D), signals containing only a received light component are obtained. Here, the ratio between signals (A–C) and (B–D) is determined by delay time Td, with it being possible to obtain distance information.

The emitted light is a pulse, and the ratio between signals (A–C) and (B–D) represents the phase of the pulse. Accordingly, this method is hereafter referred to as "pulse phase method". The inventors have found out that the pulse phase method has the following drawbacks in the case of being used for long distances or outdoors with intense background light, although it has no problem in the case of being used for relatively short distances (about several meters) and indoors with relatively weak background light.

The first drawback is a narrow dynamic range. In other words, the measurable distance range is narrow. The intensity of the received light is inversely proportional to the square of the distance to the object. For example, the intensity ratio between received light from an object at a distance of 1 m and received light from the same object at a distance of 100 m is 10000:1. Since the number of saturation electrons of a single pixel in a solid-state imaging device is typically about 10000, in the case of setting such an optical condition that allows detection at a distance of 100 m, received light from an object at a distance of 1 m is saturated, as a result of which pulse phase information is lost. In the case where background light is intense, saturation is further facilitated.

The second drawback is low tolerance to intense background light. In the drive sequence diagram in FIG. 15, pulse width To of the emitted light is determined depending on the distance measurement range. For example, in the case where the distance measurement range is 100 m, To needs to be 667 nanoseconds, and cannot be made shorter. Meanwhile, signals C and D resulting from background light increase in proportion to To, and the corresponding noise, i.e. light shot noise, is proportional to the square root of signals C and D. In the case where signals C and D are approximately equal to signals A and B respectively, the light shot noise is very high, and the distance cannot be measured with sufficient accuracy.

In view of these problems, the present disclosure has an object of providing a solid-state imaging device, a distance measurement device, and a distance measurement method that have a wide measurable distance range and can perform distance measurement even in an environment of intense background light.

To achieve the object stated above, a solid-state imaging device according to an aspect of the present invention is a solid-state imaging device including: a plurality of pixels in a two-dimensional array, the plurality of pixels each including: a light receiving circuit that includes a light receiving element for performing photoelectric conversion of converting received light into an electrical signal, sets, by an exposure signal, a photoelectric time for performing the photoelectric conversion in the light receiving element, and outputs a light reception signal depending on whether or not incident light has reached the pixel within the photoelectric time; a counter circuit that counts, as a count value, the number of times the incident light has reached the pixel, based on the light reception signal received from the light receiving circuit; a comparison circuit that sets a value corresponding to the count value as a threshold, and sets a comparison signal to an on state in the case where the count value is greater than the threshold; and a storage circuit that receives the comparison signal and a time signal changing with time, and stores, as a distance signal, the time signal when the comparison signal is in the on state.

Thus, distance information can be obtained by the solid-state imaging device, and distance measurement with a wide measurable distance range can be performed.

The solid-state imaging device may measure a distance to an object based on a time for pulse light from a light source to return, and output a distance image representing the distance to the object in one frame period, the one frame period may include a background light detection period, a distance measurement period, and a distance signal output period, the threshold may be set in the background light detection period, the distance measurement period may be divided into N periods, where N is an integer greater than or equal to 1, the exposure signal may be set with a delay of a predetermined time with respect to an emission time of the light pulse from the light source, in each of the background light detection period, the distance measurement period, and the distance signal output period, the count value may be compared with the threshold in each of the N periods in the distance measurement period, and the time signal may be stored as the distance signal in each period in which the count value is greater than the threshold, and the distance signal may be output as the distance image in the distance signal output period.

Thus, accurate distance measurement is possible even in an environment of intense background light.

The light receiving circuit may include a transfer gate transistor that transfers a charge generated by the photoelectric conversion, and the transfer gate transistor may be connected between the light receiving element and the counter circuit.

The light receiving circuit may include a plurality of pairs each made up of the light receiving element and the transfer gate transistor connected in series.

Thus, the total area of light receiving elements for light reception can be increased in the light receiving circuit, so that distance sensitivity can be further enhanced.

The light receiving circuit may be connected to a luminance image amplification transistor, the luminance image amplification transistor may be connected to a luminance image selection transistor, and the solid-state imaging device may: obtain the distance signal based on the light reception signal through the counter circuit, the comparison circuit, and the storage circuit, to obtain the distance image; and obtain the light reception signal through the luminance image amplification transistor and the luminance image selection transistor, to obtain a luminance image of the object.

Thus, a distance image and a luminance image can be obtained simultaneously.

The transfer gate transistor in each of the plurality of pairs may be connected to the counter circuit, the solid-state imaging device may output both a luminance image and a distance image in one frame period, the one frame period may include a background light detection period, a distance measurement period, a distance signal output period, and a luminance image capture and output period, and respective transfer gate transistors in the plurality of pairs may operate simultaneously in the background light detection period, the distance measurement period, and the distance signal output period, and operate separately in the luminance image capture and output period.

Thus, a distance image and a luminance image can each be obtained accurately.

The light receiving element may be an avalanche photodiode.

Thus, a distance signal with a high SN ratio can be obtained without the received light being buried in noise.

The light receiving circuit may include a light receiving element signal amplification inverter and a light reception signal switch.

Thus, the charge generated by the light receiving element can be amplified to a light reception signal having a high amplitude, to generate a binary signal.

The plurality of pixels may further include a second pixel group that includes a visible light transmission filter.

Thus, a color image can be formed by obtaining a luminance image using each of the light receiving elements corresponding to R, B, and G in the second pixel group. Moreover, a distance image can be obtained using infrared rays as the light source and using the light receiving element corresponding to infrared light in the first pixel group.

To achieve the object stated above, a distance measurement device according to an aspect of the present invention includes: the solid-state imaging device having the features described above; a light source; and a signal processing device that controls the solid-state imaging device synchronously with control of the light source, wherein the solid-state imaging device receives reflected light generated as a result of light emitted from the light source being reflected by an object, and the signal processing device outputs a distance image from the light source to the object based on an emission time of the light pulse from the light source and a time at which the solid-state imaging device receives the reflected light.

Thus, distance measurement with a wide measurable distance range can be performed. Moreover, accurate distance measurement is possible even in an environment of intense background light.

Each pixel in the second pixel group may include: a visible light receiving element; a transfer gate transistor connected to the visible light receiving element; a reset transistor connected to the transfer gate transistor; and an amplification transistor connected to the transfer gate transistor.

Thus, in the case where the visible light receiving element in the second pixel group is used at the position of infrared light, a luminance image using infrared light can also be obtained.

At least two pixels adjacent in the second pixel group may each include: a visible light receiving element; and a transfer gate transistor connected to the visible light receiving element, and the at least two pixels may include a common reset transistor and a common amplification transistor that are connected to the transfer gate transistor included in each of the at least two pixels.

Thus, at least two pixels adjacent in the second pixel group include a common reset transistor and a common amplification transistor connected to their respective transfer gate transistors. This can reduce the area of reset transistors and amplification transistors and increase the area of the second pixel group, with it being possible to improve the accuracy of the distance image.

To achieve the object stated above, a distance measurement method according to an aspect of the present invention is a distance measurement method for measuring a distance based on a time for pulse light from a light source to be reflected by an object and return, and outputting a distance image in one frame period, wherein the one frame period includes a background light detection period, a distance measurement period, and a distance signal output period, a threshold is set in the background light detection period, the distance measurement period is divided into N periods, where N is an integer greater than or equal to 1, an exposure signal is set with a delay of a predetermined time with respect to an emission time of the light pulse from the light source, in each of the background light detection period, the distance measurement period, and the distance signal output period, a count value is compared with the threshold in each of the N periods in the distance measurement period, and a time signal is stored as a distance signal in each period in which the count value is greater than the threshold, and the distance signal is output as the distance image in the distance signal output period.

Thus, distance information can be obtained by the solid-state imaging device, and distance measurement with a wide measurable distance range can be performed. Moreover, accurate distance measurement is possible even in an environment of intense background light.

The one frame period may further include a luminance image capture and output period for obtaining a luminance image of the object, and a light reception signal obtained from the object may be output as the luminance image, in the luminance image capture and output period.

Thus, a distance image and a luminance image can be obtained simultaneously.

According to the present disclosure, a solid-state imaging device, a distance measurement device, and a distance measurement method that have a wide measurable distance range and can perform distance measurement even in an environment of intense background light can be provided.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 9 is a diagram illustrating the structure of a pixel included in a solid-state imaging device according to Embodiment 3;

DETAILED DESCRIPTION OF THE EMBODIMENTS

The following describes embodiments of the present disclosure with reference to drawings. The substantially same structural elements are given the same reference marks, and their description may be omitted. The embodiments described below each show a specific example. The numerical values, shapes, materials, structural elements, the arrangement and connection of the structural elements, steps, the order of steps, etc. shown in the following embodiments are mere examples, and do not limit the scope of the present invention. Of the structural elements in the embodiments described below, the structural elements not recited in any one of the independent claims representing the broadest concepts are described as optional structural elements.

Embodiment 1

[1. Structure of Solid-State Imaging Device]

Figure 1:
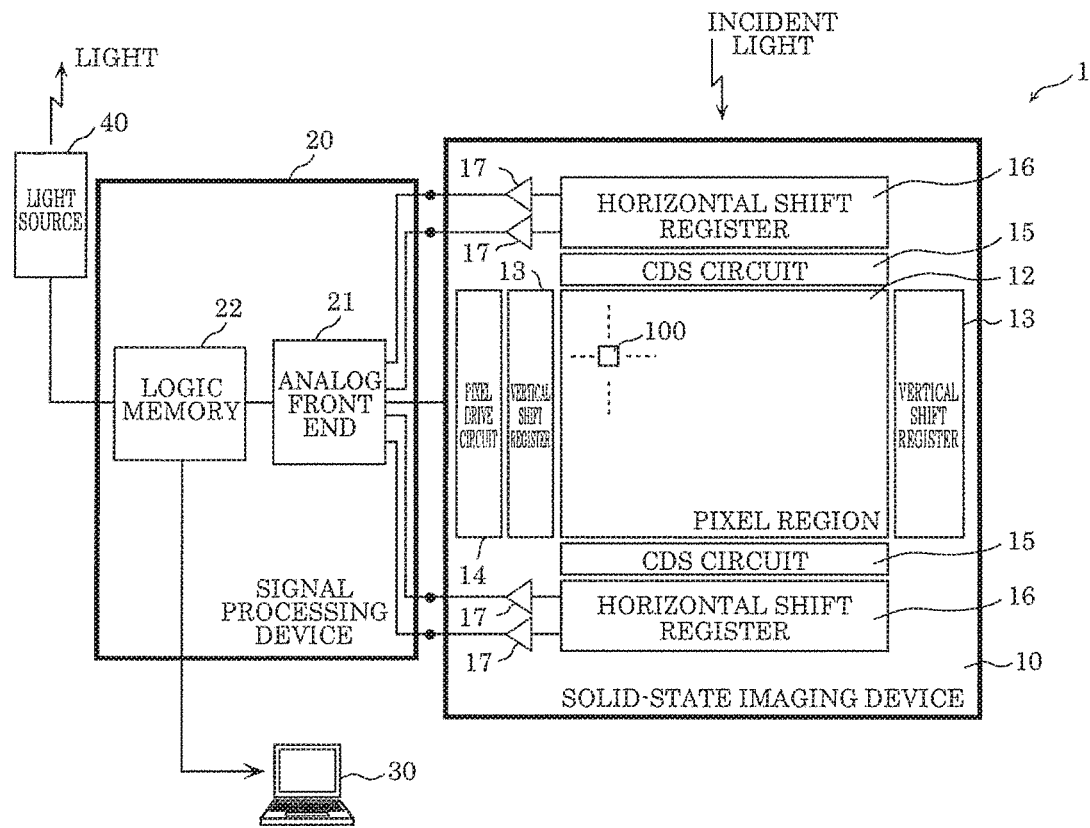
FIG. 1 is a schematic diagram illustrating the structure of a solid-state imaging device according to Embodiment 1.

The structures of distance measurement device 1 and solid-state imaging device 10 according to this embodiment are described first. FIG. 1 is a schematic diagram illustrating the structure of a distance measurement device including a solid-state imaging device according to this embodiment.

Distance measurement device 1 includes solid-state imaging device 10, signal processing device 20, calculator 30, and light source 40, as illustrated in FIG. 1.

Solid-state imaging device 10 has, but not limited to, the following structure.

Solid-state imaging device 10 includes pixel region 12, vertical shift register 13, pixel drive circuit 14, correlated double sampling (CDS) circuit 15, horizontal shift register 16, and output circuit 17, as illustrated in FIG. 1.

Figure 2:
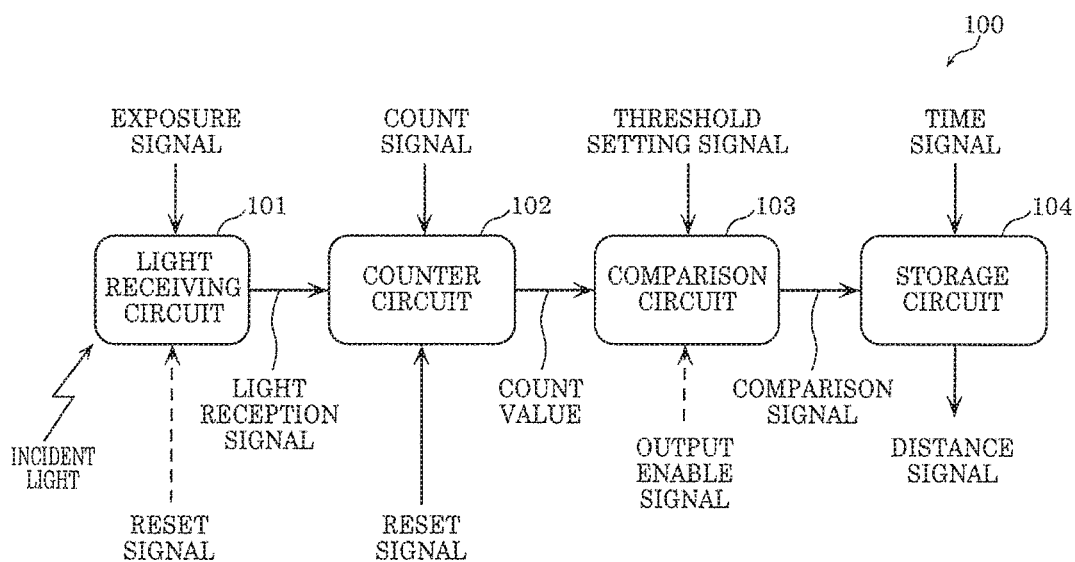
FIG. 2 is a block diagram illustrating the structure of a pixel included in the solid-state imaging device according to Embodiment 1.

Pixel region 12 has a two-dimensional array of pixels 100 illustrated in FIG. 2.

Vertical shift register 13 selects pixels 100 of a specific row in pixel region 12. This function is mainly used to sequentially output distance signals from specific pixels 100.

Pixel drive circuit 14 is used to simultaneously control all pixels 100 illustrated in FIG. 2.

CDS circuit 15 is a circuit for removing an offset component that is included in an output from pixel 100 illustrated in FIG. 2 and differs among pixels 100.

Horizontal shift register 16 is a circuit for sequentially selecting outputs from pixels 100 in the column direction.

Output circuit 17 outputs a distance signal from a pixel selected by vertical shift register 13 and horizontal shift register 16, after amplifying it if necessary. Although solid-state imaging device 10 includes four output circuits 17, the number of output circuits 17 in the solid-state imaging device is not limited to four, and may be three or less or five or more.

Signal processing device 20 includes analog front end 21 and logic memory 22, as illustrated in FIG. 1.

Analog front end 21 converts analog output signals from solid-state imaging device 10 into digital output signals and, after rearranging the output signals if necessary, outputs the output signals to logic memory 22. In the case where the output signals from solid-state imaging device 10 are digital output signals, the function of converting analog output signals into digital output signals is unnecessary, but the function of rearranging the output signals is necessary. The output signals (distance signals) from signal processing device 20 are output to calculator 30.

Calculator 30 is, for example, a computer, and generates three-dimensional information around solid-state imaging device 10 based on the output signals (distance signals) from signal processing device 20.

Light source 40 applies light to a location for which three-dimensional information is to be obtained. Light source 40 includes a mechanism that, by diffusing light according to need, applies light to the whole location for which three-dimensional information is to be obtained. Light source 40 outputs pulsed light (pulse light) in the time direction. The output time and width of the pulse light are controlled by signal processing device 20. Signal processing device 20 also controls solid-state imaging device 10 synchronously with light source 40. Solid-state imaging device 10 controls each pixel 100 therein through pixel drive circuit 14 and the like, according to a signal from signal processing device 20.

Figure 3:
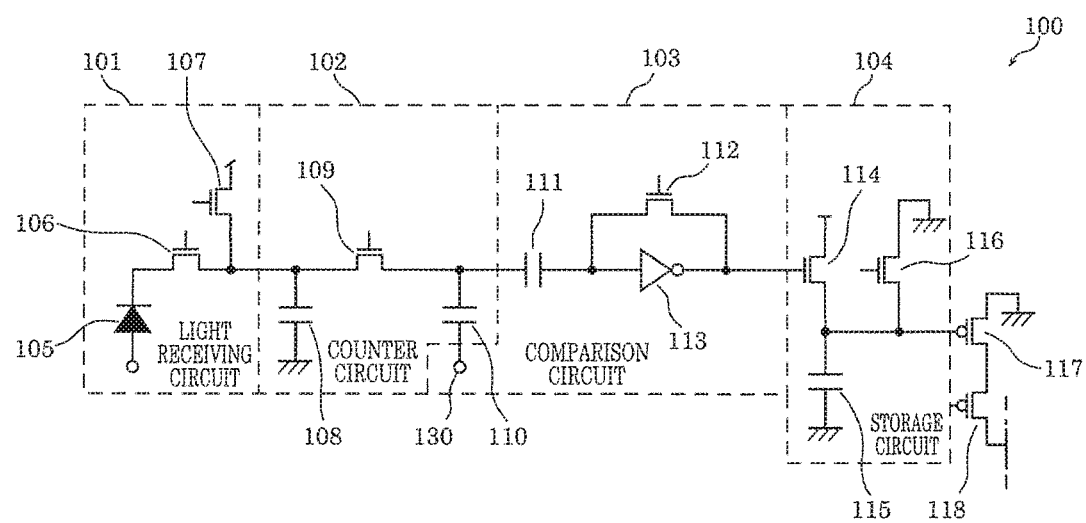
FIG. 3 is a circuit diagram illustrating the structure of the pixel included in the solid-state imaging device according to Embodiment 1.

FIG. 2 is a block diagram illustrating the structure of pixel 100 included in solid-state imaging device 10 according to this embodiment. FIG. 3 is a circuit diagram illustrating the structure of pixel 100 included in solid-state imaging device 10 according to this embodiment. Regarding each type of signal described below, "on" refers to a signal whose voltage value is high level, and "off" refers to a signal whose voltage value is low level. Moreover, "turn on" refers to applying a signal whose voltage value is high level, and "turn off" refers to applying a signal whose voltage value is low level.

Pixel 100 illustrated in FIG. 2 includes four blocks, namely, light receiving circuit 101, counter circuit 102, comparison circuit 103, and storage circuit 104. The structure and function of each block are described below. The structure of providing each block with the corresponding function described here may be modified to some extent, within the scope equivalent to the present disclosure.

Light receiving circuit 101 includes light receiving element 105, transfer gate transistor 106, and reset transistor 107, as illustrated in FIG. 3. Light receiving element 105 and transfer gate transistor 106 are connected in series, and one light receiving element 105 and one transfer gate transistor 106 constitute a pair. Transfer gate transistor 106 is connected between light receiving element 105 and counter circuit 102.

Light receiving element 105 is, for example, a photodiode. Transfer gate transistor 106 transfers charge generated by photoelectric conversion in light receiving element 105. Light receiving circuit 101 thus has a function of receiving incident light and converting it into a light reception signal. The light reception signal may change depending on the intensity of the incident light, but is desirably a binary signal depending on whether or not the incident light has reached. The following description is based on the premise that the light reception signal is binary, although pixel 100 can operate even when the light reception signal is not binary. In the case where the light reception signal is not binary, it is assumed that the signal is binary depending on whether or not it exceeds a threshold set in circuitry. Moreover, a given photoelectric conversion time can be set in response to an exposure signal which is an input signal. A function of resetting the light reception signal in response to a reset signal may be added. Hereafter, the light reception signal in the case where light has been received is referred to as "light reception signal is present", and the light reception signal in the case where light has not been received is referred to as "light reception signal is absent". In the case where the reset function is not added, a function of resetting the electrical signal at the same time as or within a sufficiently short time from the output of the light reception signal is added.

Pixel 100 illustrated in FIG. 2 also includes counter circuit 102 connected to the output of light receiving circuit 101.

Counter circuit 102 includes charge accumulation capacitor 108, counter transistor 109, and counter capacitor 110, as illustrated in FIG. 3. Output enable signal 130 is output through counter capacitor 110. Counter circuit 102 has a function of holding, increasing, and resetting a count value. Counter circuit 102 resets the count value, in response to a reset signal. In a period during which an input count signal is on, counter circuit 102 detects the light reception signal. In the case where the light reception signal is detected, counter circuit 102 increases the count value by 1. Thus, counter circuit 102 counts the number of times the light reception signal has reached light receiving circuit 101.

Pixel 100 illustrated in FIG. 2 also includes comparison circuit 103 connected to the output of counter circuit 102.

Comparison circuit 103 includes DC cut capacitor 111, clamp transistor 112, and inverter 113, as illustrated in FIG. 3. Comparison circuit 103 has a function of setting and holding a given threshold of the number of times counted by counter circuit 102. When an input threshold setting signal is on, a threshold corresponding to the input count value is set. Comparison circuit 103 also has a function of, when the threshold setting signal is off, turning on a comparison signal in the case where the count value is greater than the set threshold. Comparison circuit 103 may receive the output enable signal as input. In this case, comparison circuit 103 turns on the comparison signal only in the case where the output enable signal is on. The output enable signal will be described in Embodiment 2.

Pixel 100 illustrated in FIG. 2 also includes storage circuit 104.

Storage circuit 104 includes input transistor 114, storage capacitor 115, and storage node reset transistor 116, as illustrated in FIG. 3. Storage circuit 104 has two inputs. One input is the comparison signal, and the other input is a signal that changes with time, i.e. a time signal. Storage circuit 104 has a function of storing the value of the time signal at the timing at which the comparison signal is turned on. Storage circuit 104 also has a function of outputting the stored time signal (as a distance signal).

Storage circuit 104 is connected to amplification transistor 117 and selection transistor 118, as illustrated in FIG. 3.

Solid-state imaging device 10 includes a two-dimensional array of pixels 100 illustrated in FIG. 2. Although the above describes the case where distance measurement device 1 including solid-state imaging device 10 has the structure illustrated in FIG. 1, the present disclosure is not limited to such.

[2. Operation of Solid-State Imaging Device]

Figure 4:
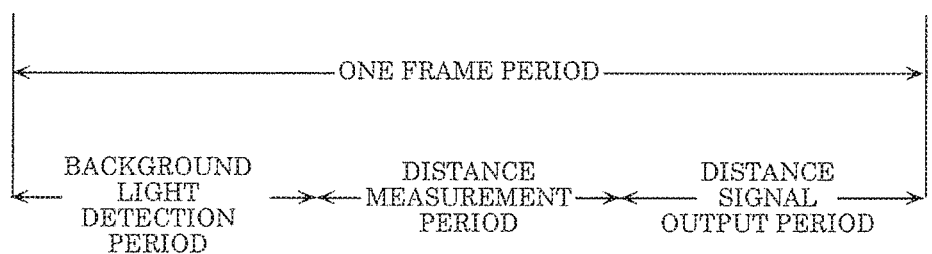
FIG. 4 is a diagram illustrating operation periods included in one frame period of the solid-state imaging device according to Embodiment 1.

The operation of solid-state imaging device 10 according to this embodiment is described below. FIG. 4 is a diagram illustrating operation periods included in one frame period of solid-state imaging device 10.

As illustrated in FIG. 4, one frame period includes a background light detection period, a distance measurement period, and a distance signal output period. Solid-state imaging device 10 repeats the background light detection period, the distance measurement period, and the distance signal output period in this order.

Figure 5:
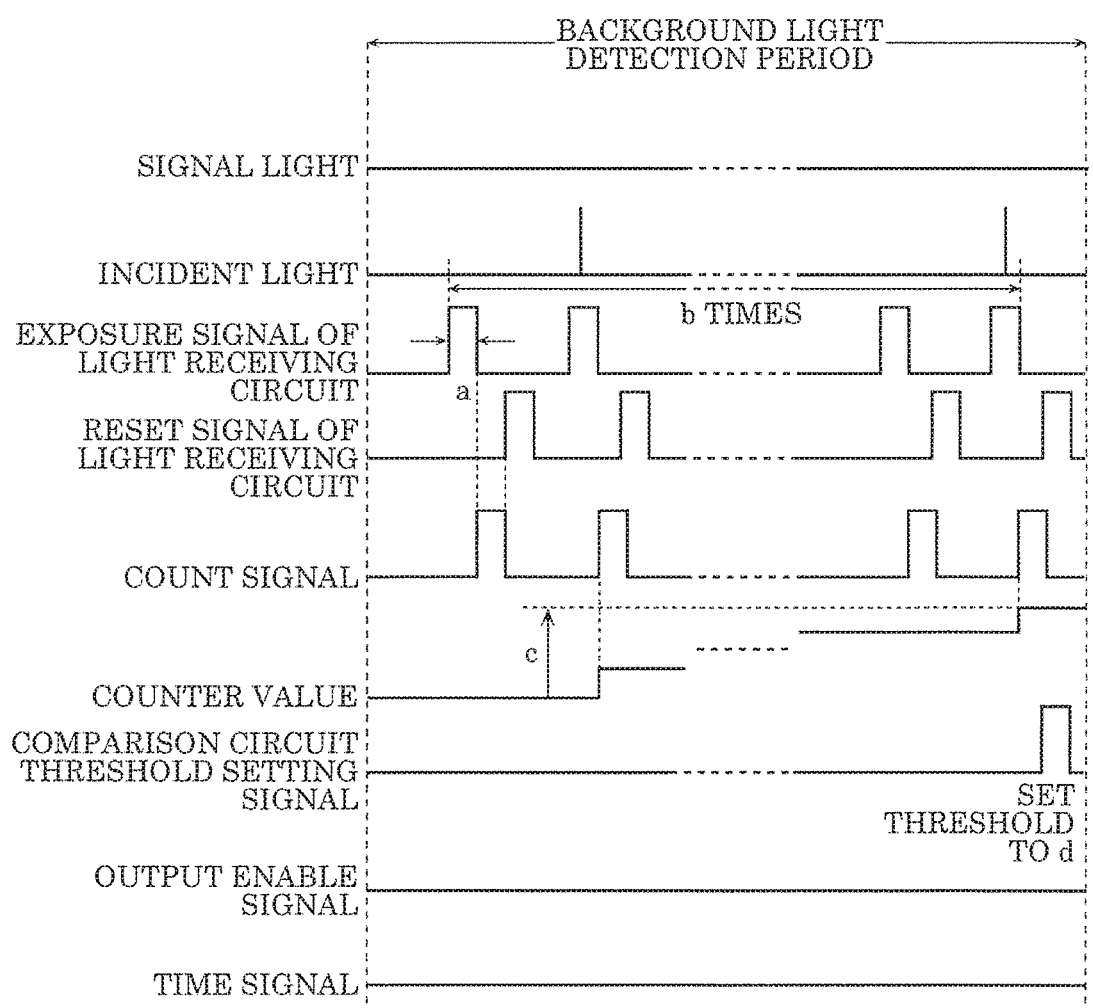
FIG. 5 is a diagram illustrating an operation sequence in a background light detection period in the solid-state imaging device according to Embodiment 1.
Figure 6:
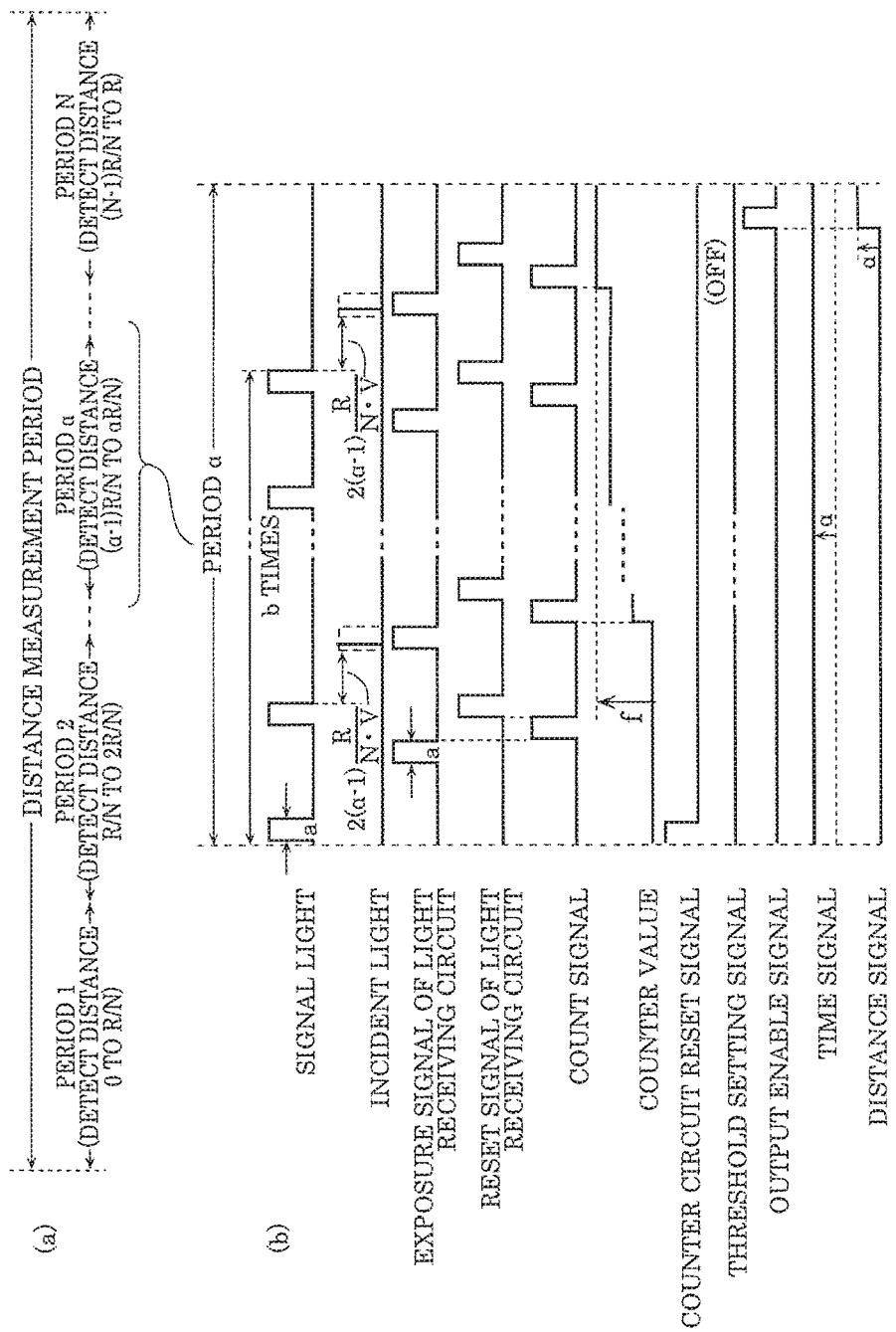
FIG. 6 is a diagram illustrating an operation sequence in a distance measurement period in the solid-state imaging device according to Embodiment 1.

FIG. 5 is a diagram illustrating an operation sequence in the background light detection period in solid-state imaging device 10 according to this embodiment. FIG. 6 is a diagram illustrating an operation sequence in the distance measurement period in solid-state imaging device 10 according to this embodiment.

As illustrated in FIG. 5, in the background light detection period, the output of light source 40 is kept off in solid-state imaging device 10. In this state, light receiving circuit 101 in pixel 100 illustrated in FIG. 2 detects incident light. Here, light resulting from background light (typically, sunlight in the case of outdoors during daytime) in an ambient environment being reflected by an imaging object (object) is incident on light receiving circuit 101. A circuit installed in association with light receiving circuit 101 sets the photoelectric conversion time (exposure time) to a seconds, and light receiving circuit 101 receives the background light. In the case where the light has reached the pixel within a seconds, light receiving circuit 101 sets a "light reception signal present" state. The count signal is then turned on. In the case where the light reception signal is present, the counter value is increased by 1.

After this, the reset signal of light receiving circuit 101 is turned on, to reset the electrical signal and the light reception signal in light receiving circuit 101. This series of operations is repeatedly performed b times. Hence, counter circuit 102 counts and stores how many times the light has reached in the exposure performed b times. Suppose the light has reached c times. This is based on the premise that the value of a is sufficiently small, or the incident light is sufficiently small and can be decomposed into several photons and regarded as entering light receiving circuit 101 intermittently. Normally, this premise holds sufficiently if a is less than or equal to several ten nanoseconds.

The threshold setting signal is then turned on for comparison circuit 103, and a threshold corresponding to the c times as the output value of counter circuit 102 is set. Although the threshold may be c, i.e. the output value of counter circuit 102 itself, the threshold is set to d=c+e (e is any positive value) in this example.

Following this, the operation in the distance measurement period is performed. Suppose, as the distance measurement range, an object in the range of R meters from the close proximity of solid-state imaging device 10 is to be detected. Also suppose the resolution is R/N meters (N is an integer greater than or equal to 1). To realize this, the following operation is performed in the distance measurement period, as illustrated in FIG. 6.

As illustrated in FIG. 6, the distance measurement period is divided into N periods. For example, the divided sections are period 1 for detecting 0 to R/N meters, period 2 for detecting R/N to 2R/N meters, . . . , period α for detecting (α−1)R/N to αR/N meters (α is an integer greater than or equal to 1 and less than or equal to N), . . . , and period N for detecting (N−1)R/N to R meters. The division of the distance measurement period is not limited to such, and the distance measurement period may be divided, for example, at irregular pitches. It is assumed here that the distance measurement period is divided as mentioned above.

The operation in period α is described below. First, the counter circuit reset signal is turned on, to reset the counter value. Moreover, the time signal input to storage circuit 104 is set to α. The value of the time signal input to storage circuit 104 may be any value, as long as it differs among periods 1 to N. The value of the time signal may change continuously (the value is constant in period α in FIG. 6).

Further, light source 40 is controlled to emit a light pulse with a width of a seconds. In the case where the light is reflected by an object corresponding to a distance measured in period α, i.e. an object (α−1)R/N to αR/N meters away, and is incident on a pixel in solid-state imaging device 10, the light pulse reflected by the object (hereafter referred to as "received light") reaches solid-state imaging device 10 with a delay of

[Math. 1]

$$2(\alpha - 1)\frac{R}{N \cdot V} \quad \text{(Expression 1)}$$

with respect to the emission time of the light pulse emitted from the light source (hereafter referred to as "emitted light"), where V is the velocity of light. Accordingly, if the exposure signal of light receiving circuit 101 is set so that exposure is started at this time and performed for a seconds, then received light from an object in this distance range can be detected. After this, counter circuit 102 counts the number of times the received light has been detected according to the count signal, i.e. the number of times the light has reached. Reset is then performed by the reset signal of light receiving circuit 101.

By the above-mentioned procedure, the exposure is repeatedly performed b times, and the number of times the light has reached is counted by counter circuit 102. If there is no object in the distance range corresponding to period α, an expected value of the count is c times corresponding to the background light component. Since this is less than threshold d, the operation of comparison circuit 103 located subsequent to counter circuit 102 is unchanged. If there is an object in the distance range corresponding to period α, an expected value of the count is f times, i.e. a value greater than c times. Thus, in the case where the received light intensity is sufficiently high, $$f > d \qquad \text{(Expression 2)}$$

is satisfied.

After this, the output enable signal of comparison circuit 103 is turned on. In the case where Expression 2 is satisfied, the comparison signal is turned on, and the time signal is stored as the distance signal. In the case where Expression 2 is not satisfied, the stored distance signal (which may be an initial value) is unchanged.

Period (α+1) then follows. After period N, the distance measurement period ends. Here, storage circuit 104 in each pixel stores the signal corresponding to the distance to the object captured by the pixel, i.e. the distance signal.

Lastly, in the distance signal output period, the distance signal stored in each pixel is output. In solid-state imaging device 10 in distance measurement device 1 illustrated in FIG. 1, vertical shift register 13 and horizontal shift register 16 select the pixels sequentially, to output the distance signals. By processing these distance signals by signal processing device 20 and the like, three-dimensional information (i.e. distance image) is obtained. Each signal from solid-state imaging device 10 for obtaining the distance image is hereafter also simply referred to as "distance image".

The above describes the case where the exposure time in the background light detection period and the exposure time in the distance measurement period are the same and the number of light pulses in the background light detection period and the number of light pulses in the distance measurement period are the same, but the present disclosure is not limited to such. In the case where these values are different, the requirement for satisfying Expression 2 is modified depending on the different value.

Moreover, the delay time of the exposure signal with respect to the emission time of the light pulse in each period is not limited to such, and many variations are easily applicable.

The reason why the distance measurement by solid-state imaging device 10 according to this embodiment has a wider distance measurement dynamic range than the pulse phase method in the background art document is given below.

The pulse phase method is, simply put, a method of measuring a distance based on a change in intensity of received light. Hence, measurement is impossible if the pixel saturation level is exceeded. The received light intensity is inversely proportional to the square of the distance to the object, and is proportional to the reflectivity of the object. For example, suppose the maximum measurement distance is 100 meters, and the reflectivity of the object to be measured is 10% to 100%. Then, the ratio between the received light intensity from an object at a distance of 1 meter with a reflectivity of 100% and the received light intensity from an object at a distance of 100 meters with a reflectivity of 10% is 100000:1. The number of saturation electrons of a single pixel in a typical solid-state imaging device is about 10000. This means the above-mentioned two objects cannot be measured simultaneously.

In the distance measurement by solid-state imaging device 10, on the other hand, the only condition for measurability is that the received light intensity is high enough to satisfy Expression 2, and measurability does not depend on a change in received light intensity due to the distance to the object and the reflectivity. For this reason, the distance measurement by solid-state imaging device 10 has a wider distance dynamic range than the pulse phase method.

The reason why the distance measurement by solid-state imaging device 10 has higher tolerance to background light intensity than the pulse phase method is given below. Suppose, as the measurement condition, an object in the range of R meters from the close proximity is to be detected, as mentioned above. Also suppose a measurement accuracy of R/N meters is ensured.

The influence of background light is most significant when measuring an object at the longest distance, i.e. an object R meters away. This is because, while the reflected light intensity from the object resulting from the background light does not depend on the distance to the object, the received light from the light source is inversely proportional to the square of the distance. In other words, the SN ratio in the received light decreases as the distance increases.

A condition for measurable received light is calculated below. Here, the number of photons is used as the unit of energy. The calculation is based on an assumption that the shot noise of background light is a dominant noise component and, relative to it, the shot noise of received light is sufficiently small and is negligible.

Let S be the number of incident peak photons of received light to a single pixel per unit time (which is a value obtained by converting the incident peak power to the number of photons). S is determined by the energy of the light source and the reflectivity and distance of the object. Simultaneously with this received light, a component resulting from background light being reflected by the object is superimposed. Let B be the number of photons of the incident light component resulting from background light per unit time. In the pulse phase method, the pulse width needs to be

[Math. 2]

$$\frac{2R}{V}. \qquad \text{(Expression 3)}$$

Let M be the number of pulses. Then, total energy T of received light to a single pixel is

[Math. 3]

$$T = S \cdot \frac{2R}{V} \cdot M. \qquad \text{(Expression 4)}$$

Meanwhile, the total energy of the component of background light is

[Math. 4]

$$B \cdot \frac{2R}{V} \cdot M, \qquad \text{(Expression 5)}$$

on which light shot noise

[Math. 5]

$$\sqrt{B \cdot 2\frac{R}{V} \cdot M} \qquad \text{(Expression 6)}$$

is superimposed. The necessary condition for calculation with an accuracy of R/N meters using measured received light energy T is that T can be measured with an accuracy of T/N or less. In other words, the condition is

[Math. 6]

$$\frac{T}{N} > \sqrt{B \cdot 2 \frac{R}{V} \cdot M}$$

$$T > N \sqrt{B \cdot 2 \frac{R}{V} \cdot M}.$$

(Expression 7)

On the other hand, an expression corresponding to Expression 7 for the distance measurement by solid-state imaging device 10 is derived as follows. First, the width of a single light pulse and the exposure time for detecting it only need to be less than or equal to the time for passing double the distance range corresponding to one period at the velocity of light, that is,

[Math. 7]

$$2\frac{R}{VN}.$$

(Expression 8)

Suppose the width of a single light pulse and the exposure time for detecting it are equal to Expression 8. The total energy of received light incident on a single pixel in one period is

[Math. 8]

$$\frac{T}{N}.$$

(Expression 9)

It is assumed here that the number of pulses and the peak energy are equal in each period. Simultaneously with this, the light energy by incident background light is

[Math. 9]

$$B \cdot 2 \frac{R}{VN} \cdot b.$$

(Expression 10)

The light shot noise of this light is

[Math. 10]

$$\sqrt{B \cdot 2 \frac{R}{VN} \cdot b}.$$

(Expression 11)

Threshold d at least needs to be greater than the sum of Expression 10 and Expression 11. In addition, to avoid erroneously determining that, in a period during which the received light has not reached, the received light has reached, threshold d needs to be higher. According to statistical theory, the probability that the light shot noise in Expression 11 is greater than γ times Expression 11 is 16% when γ=1, 2.5% when γ=2, and 0.15% when γ=3. If this probability is less than 1/N, the erroneous determination is avoided. For example, in the case where N=100, γ=3 will suffice. Since threshold d is

[Math. 11]

$$d = B \cdot 2 \frac{R}{VN} b + \gamma \cdot \sqrt{B \cdot 2 \frac{R}{VN} \cdot b},$$

(Expression 12)

the necessary condition for measurement without erroneous determination is

[Math. 12]

$$\frac{T}{N} > \gamma \cdot \sqrt{B \cdot 2 \frac{R}{VN} \cdot b}.$$

(Expression 13)

Consider the case where the total number of pulses in the distance measurement by solid-state imaging device 10 matches that in the measurement by the pulse phase method, for the sake of simplicity. In detail, suppose, in the distance measurement by solid-state imaging device 10, the number of pulses M in the pulse phase method, the number of measurement periods N, and the number of pulses b in each measurement period satisfy M=Nb. Then, Expression 13 is

[Math. 13]

$$T > \frac{\gamma}{N} \sqrt{B \cdot 2 \frac{R}{V} \cdot M}.$$

(Expression 14)

Comparison between Expression 14 and Expression 7 reveals that, at least in the case where N>γ, the distance measurement method by solid-state imaging device 10 can perform measurement with lower light source energy than the pulse phase method, i.e. has higher tolerance to background light than the pulse phase method. If the distance measurement by solid-state imaging device 10 is used for gesture recognition, obstacle detection in a vehicle-installed state, or the like, at least N>100 is required. Hence, substantially lower light source energy than the pulse phase method will suffice.

The reason why the distance measurement accuracy is high even in the case where the background light component is small is given below. Suppose the main component of noise is the light shot noise of the received light component, and other noise is negligible.

In the pulse phase method, the light shot noise component of the received light component is assumed to be approximately equal to light shot noise for light energy T, that is,

[Math. 14]

$$\sqrt{S \cdot 2 \frac{R}{V} \cdot M}.$$

(Expression 15)

The necessary condition for calculation with an accuracy of R/N meters is that T can be measured with an accuracy of T/N or less. In other words,

[Math. 15]

$$\frac{T}{N} > \sqrt{S \cdot 2\frac{R}{V} \cdot M}$$

$$S > \frac{V}{2RM}N^2.$$

(Expression 16)

In the distance measurement by solid-state imaging device 10, assuming that M=Nb for the sake of simplicity, the number of received photons in a single measurement period is

[Math. 16]

$$S \cdot 2 \frac{R}{V} \frac{M}{N}$$

The necessary condition for an accuracy of R/N meters is that the received light energy in a single measurement period is one photon or more. In other words,

[Math. 17]

$$S > \frac{V}{2RM}N.$$

(Expression 17)

Comparison between Expression 16 and Expression 17 reveals that, in the case where N>1, the distance measurement by solid-state imaging device 10 can be performed with lower light energy than the pulse phase method. Conversely, with the same light energy, the distance measurement by solid-state imaging device 10 has higher distance measurement accuracy.

Thus, with solid-state imaging device 10 according to this embodiment, the measurable distance range is wide, and distance measurement is possible even in an environment of intense background light.

Embodiment 2 and the subsequent embodiments are described below, while disclosing a specific circuit structure of each block in pixel 100 illustrated in FIG. 2. The illustrated circuit structure is, however, merely an example, and the present disclosure is not limited to such. Moreover, the pixel may be configured so that one block has the disclosed circuit structure and another block is a circuit having the function described in Embodiment 1.

Embodiment 2

Figure 7:
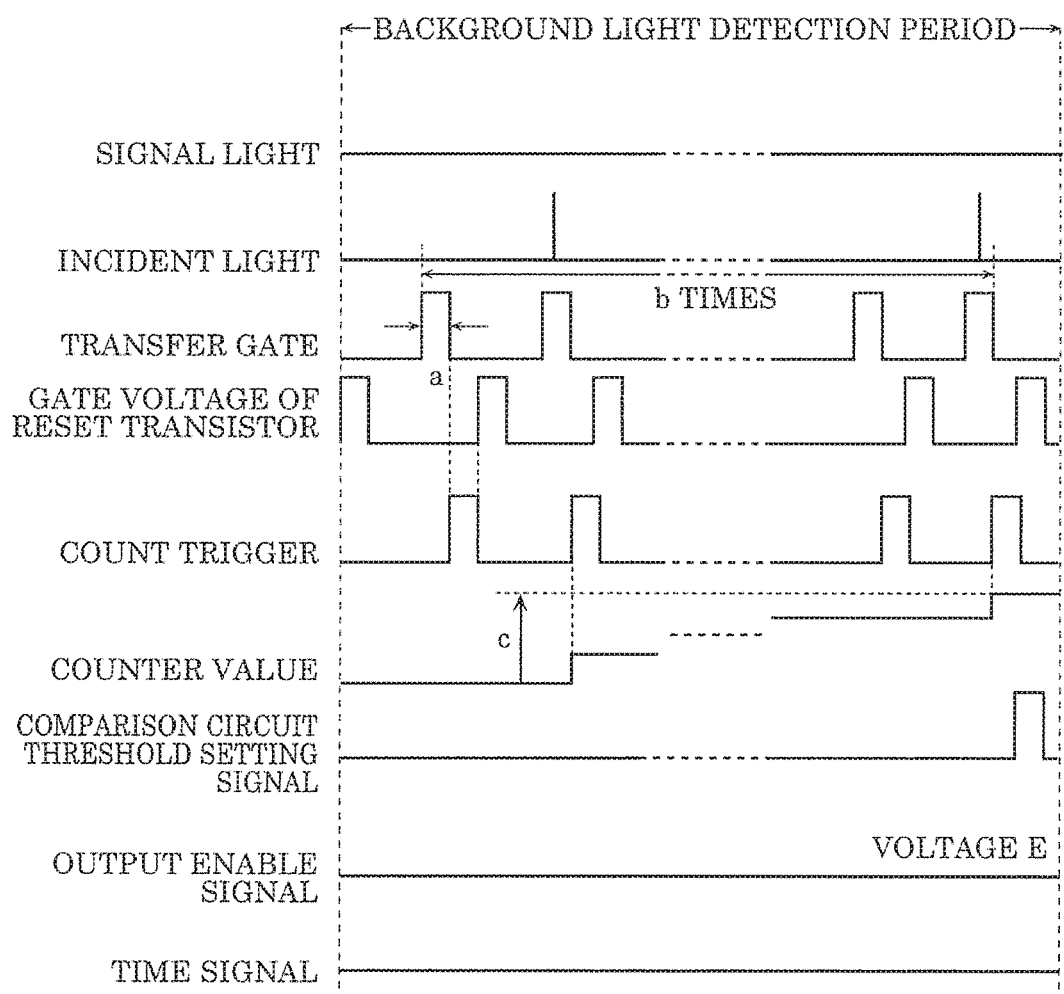
FIG. 7 is a diagram illustrating an operation sequence in a background light detection period in a solid-state imaging device according to Embodiment 2.
Figure 8:
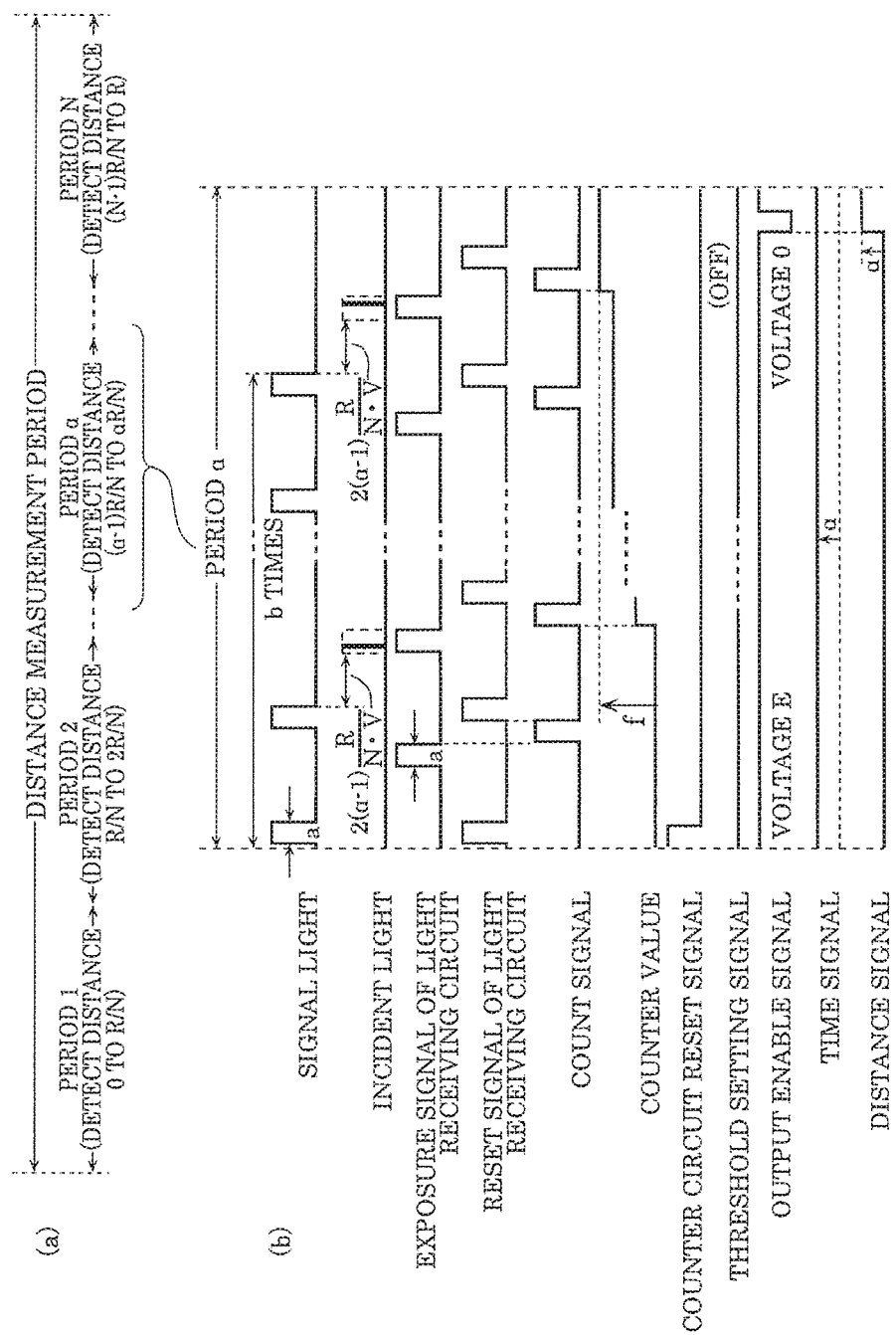
FIG. 8 is a diagram illustrating an operation sequence in a distance measurement period in the solid-state imaging device according to Embodiment 2.

A solid-state imaging device according to Embodiment 2 is described below, with reference to FIGS. 7 and 8. FIG. 7 is a diagram illustrating an operation sequence in the background light detection period in the solid-state imaging device according to this embodiment. FIG. 8 is a diagram illustrating an operation sequence in the distance measurement period in the solid-state imaging device according to this embodiment.

Solid-state imaging device 10 according to this embodiment differs from solid-state imaging device 10 according to Embodiment 1 in that the output enable signal is input to comparison circuit 103.

The structure of solid-state imaging device 10 is the same as the structure of solid-state imaging device 10 according to Embodiment 1. The following describes pixel 100 in solid-state imaging device 10 according to this embodiment, where the description of the same parts as those of solid-state imaging device 10 according to Embodiment 1 is omitted as appropriate.

The overall operation of solid-state imaging device 10 in one frame is the same as that in FIG. 4.

As illustrated in FIG. 7, in the background light detection period, signal light from light source 40 is turned off, as in Embodiment 1. In the background light detection period, the incident light on solid-state imaging device 10 is limited to background light. A transfer gate pulse in transfer gate transistor 106 is set to on for a seconds, to turn on transfer gate transistor 106. Before turning on transfer gate transistor 106, reset transistor 107 is turned off beforehand. The transfer gate pulse is then turned on. Thus, light receiving element 105 is reset.

After this, if light is incident during a seconds, the charge corresponding to the incident light is accumulated in charge accumulation capacitor 108 through transfer gate transistor 106.

After a seconds, transfer gate transistor 106 is turned off. A counter trigger which is a voltage applied to the gate of counter transistor 109 is then turned on, and the charge is transferred to counter capacitor 110.

Subsequently, the counter trigger is turned off, and reset transistor 107 is turned on, to reset the charge in charge accumulation capacitor 108. This operation is repeatedly performed b times.

A comparison circuit threshold setting signal is then turned on. By applying this signal to clamp transistor 112, the voltage of counter capacitor 110 corresponding to the background light is stored as a voltage across DC cut capacitor 111. During this, the voltage of the output enable signal is set to voltage E.

In the distance measurement period, the period is divided into a plurality of periods, as in Embodiment 1. FIG. 8 illustrates an operation sequence in the distance measurement period.

In period α, first, reset transistor 107 is turned on beforehand to reset the charge in charge accumulation capacitor 108, as in the background light detection period.

After this, a signal light pulse with a width of a seconds is emitted. The transfer gate transistor is turned on, with a delay of the time represented by Expression 1 with respect to the emitted signal light pulse. After turning on the transfer gate transistor for a seconds, the counter trigger is turned on, and the charge generated in light receiving element 105 is transferred to charge accumulation capacitor 108. This operation is repeatedly performed b times.

Subsequently, the voltage of the output enable signal is changed to 0. Here, if the absolute value of the counter value stored in counter capacitor 110 is greater than the absolute value of the sum of voltage E and the threshold of comparison circuit 103 set in the background light detection period, the state of inverter 113 in comparison circuit 103 changes, to turn on input transistor 114.

This threshold can be adjusted by increasing or decreasing the voltage at the other end of counter capacitor 110. The value corresponding to voltage E mentioned above can thus be adjusted. The voltage value that is set is not limited to E and 0, and the difference between the set value in the background light detection period and the set value in this period is the value corresponding to E.

The time signal (voltage) corresponding to the distance signal is applied to the drain of input transistor 114. For example, (1+α/R) V may be applied. When the gate is turned on by comparison circuit 103, the voltage corresponding to the distance signal is stored in storage capacitor 115.

After all periods end, the voltage corresponding to the distance to the object has been stored in storage capacitor 115 of each pixel. These signals are sequentially output in the distance signal output period. For example, in the case where this pixel 100 is included in solid-state imaging device 10 illustrated in FIG. 1, the following operation is performed.

First, selection transistor 118 is turned on. At this time, the voltage stored in storage capacitor 115 is output by amplification transistor 117. An offset voltage unique to amplification transistor 117 is actually superimposed on the output voltage. Storage node reset transistor 116 is then turned on, to reset the voltage of storage capacitor 115. The output voltage from amplification transistor 117 after storage node reset transistor 116 is turned off is read. CDS circuit 15 in solid-state imaging device 10 can then remove the offset voltage, with it being possible to obtain the distance signal.

Embodiment 3

A solid-state imaging device according to Embodiment 3 is described below, with reference to FIG. 9. FIG. 9 is a diagram illustrating the structure of a pixel included in the solid-state imaging device according to this embodiment.

The solid-state imaging device according to this embodiment differs from the solid-state imaging device according to Embodiment 1 in that the light receiving circuit includes a plurality of pairs each made up of a light receiving element and a transfer gate transistor.

As illustrated in FIG. 9, pixel 200 in the solid-state imaging device according to this embodiment includes light receiving circuit 201, counter circuit 102, comparison circuit 103, and storage circuit 104.

Light receiving circuit 201 includes light receiving elements 205a, 205b, 205c, and 205d, transfer gate transistors 206a, 206b, 206c, and 206d, and reset transistor 207. The components other than light receiving circuit 201 in pixel 200 illustrated in FIG. 9 are the same as those in pixel 300 illustrated in FIG. 10A, and so their detailed description is omitted.

Light receiving elements 205a, 205b, 205c, and 205d and transfer gate transistors 206a, 206b, 206c, and 206d respectively constitute pairs. The plurality of pairs are connected in parallel. In light receiving circuit 201, transfer gate transistors 206a, 206b, 206c, and 206d perform on-off operation simultaneously. In this way, the total area of light receiving elements for light reception is increased in light receiving circuit 201, so that the sensitivity to the distance to an object can be further enhanced.

Embodiment 4

Figure 10A:
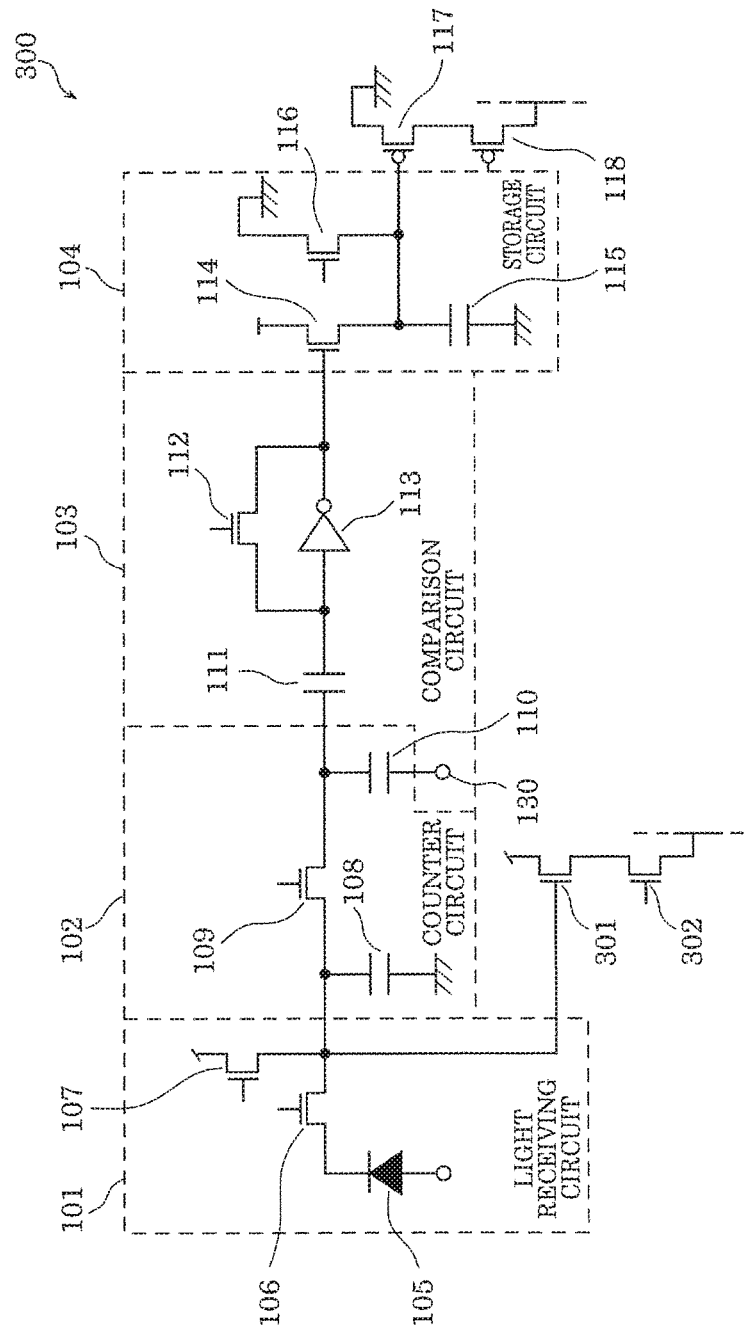
FIG. 10A is a diagram illustrating the structure of a pixel included in a solid-state imaging device according to Embodiment 4.
Figure 10B:
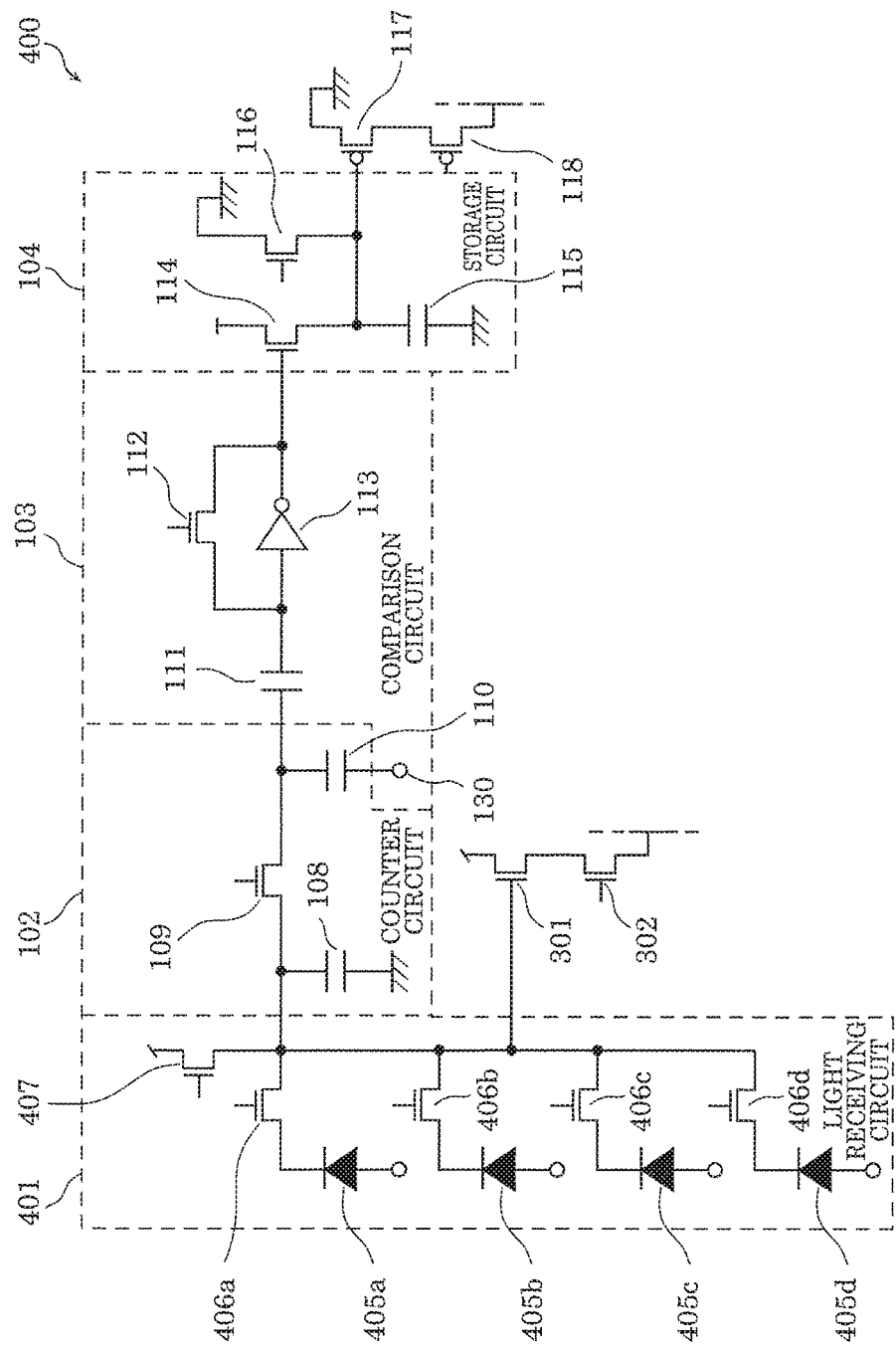
FIG. 10B is a diagram illustrating the structure of the pixel included in the solid-state imaging device according to Embodiment 4.
Figure 11:
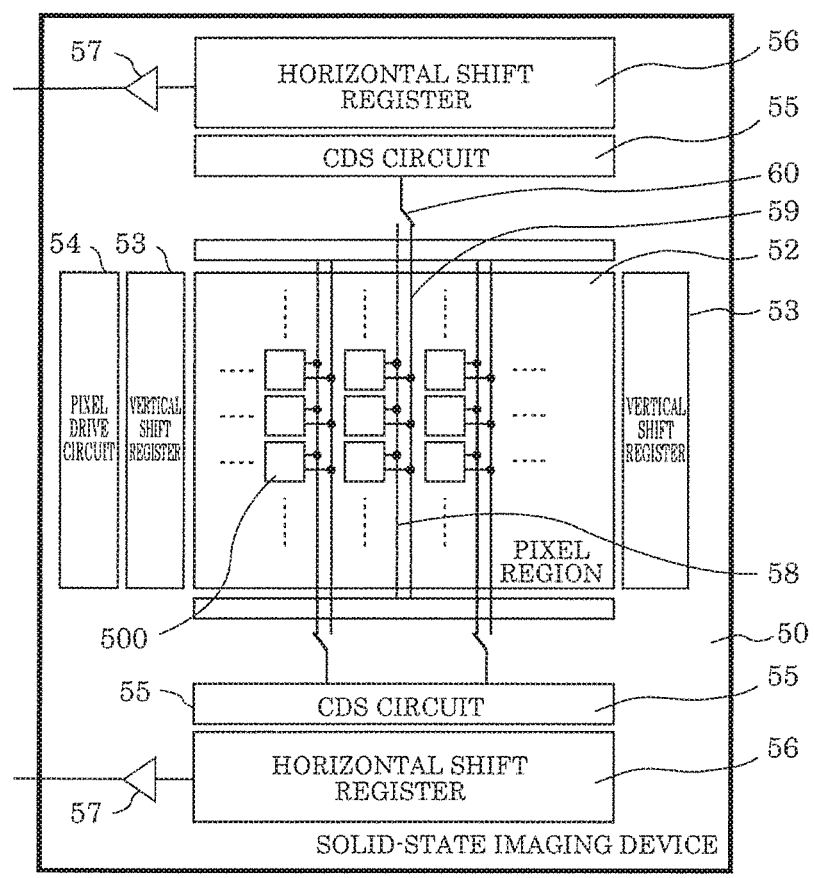
FIG. 11 is a schematic diagram illustrating the structure of the solid-state imaging device according to Embodiment 4.
Figure 12:
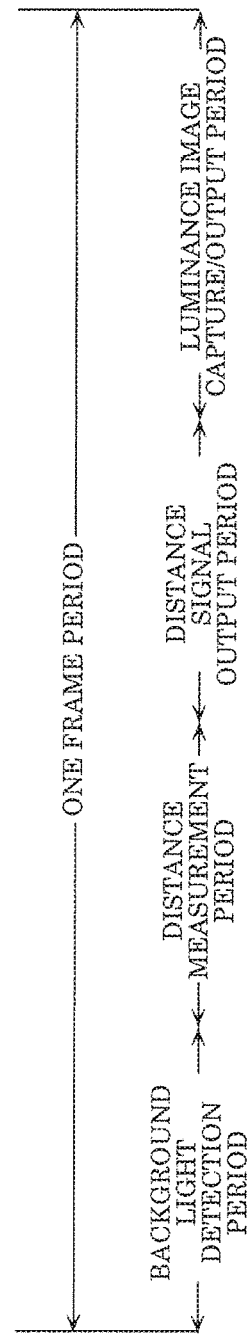
FIG. 12 is a diagram illustrating operation periods included in one frame period of the solid-state imaging device according to Embodiment 4.

A solid-state imaging device according to Embodiment 4 is described below, with reference to FIGS. 10A to 12. FIGS. 10A and 10B are each a diagram illustrating the structure of a pixel included in the solid-state imaging device according to this embodiment. FIG. 11 is a schematic diagram illustrating the structure of the solid-state imaging device according to this embodiment. FIG. 12 is a diagram illustrating the operation in one frame period of the solid-state imaging device according to this embodiment.

The solid-state imaging device according to this embodiment differs from the solid-state imaging device according to Embodiment 1 in that the pixel includes a luminance image amplification transistor and a luminance image selection transistor.

As illustrated in FIG. 10A, pixel 300 includes light receiving circuit 101, counter circuit 102, comparison circuit 103, and storage circuit 104. The structures of light receiving circuit 101, counter circuit 102, comparison circuit 103, and storage circuit 104 are the same as the structures of light receiving circuit 101, counter circuit 102, comparison circuit 103, and storage circuit 104 in Embodiment 1, and so their detailed description is omitted. Pixel 300 further includes luminance image amplification transistor 301 and luminance image selection transistor 302. Thus, solid-state imaging device 10 obtains the distance signal based on the light reception signal through counter circuit 102, comparison circuit 103, and storage circuit 104 to obtain the distance image, and obtains the light reception signal through luminance image amplification transistor 301 and luminance image selection transistor 302 to obtain the luminance image of the object.

Pixel 300 illustrated in FIG. 10A is characterized in that luminance image amplification transistor 301 and luminance image selection transistor 302 are added. The part combining luminance image amplification transistor 301, luminance image selection transistor 302, and light receiving circuit 101 has the same structure as a pixel sharing type circuit of a typical solid-state imaging device. Accordingly, a typical two-dimensional object luminance image can be obtained with this part alone.

The number of pairs of light receiving elements and transfer gate transistors may be one, such as light receiving element 105 and transfer gate transistor 106 illustrated in FIG. 10A. Alternatively, the number of pairs of light receiving elements and transfer gate transistors may be more than one, as illustrated in FIG. 10B. In pixel 400 illustrated in FIG. 10B, light receiving circuit 401 includes light receiving elements 405a, 405b, 405c, and 405d and transfer gate transistors 406a, 406b, 406c, and 406d respectively paired with these light receiving elements, as in light receiving circuit 201 in Embodiment 3. In this way, the total area of light receiving elements for light reception is increased in light receiving circuit 401, so that the sensitivity to the distance to an object can be further enhanced. The components other than light receiving circuit 401 in pixel 400 illustrated in FIG. 10B are the same as those in pixel 300 illustrated in FIG. 10A, and so their detailed description is omitted.

A solid-state imaging device including pixel 300 or 400 described above is, for example, solid-state imaging device 50 illustrated in FIG. 11.

Solid-state imaging device 50 includes pixel region 52, vertical shift register 53, pixel drive circuit 54, CDS circuit 55, horizontal shift register 56, output circuit 57, luminance signal line 58, distance signal line 59, and luminance-distance selection switch 60.

Pixel region 52 includes a two-dimensional array of pixels 500. Each pixel 500 has the structure of pixel 300 or 400 described above.

The structures of vertical shift register 53, pixel drive circuit 54, CDS circuit 55, horizontal shift register 56, and output circuit 57 are the same as the structures of vertical shift register 13, pixel drive circuit 14, CDS circuit 15, horizontal shift register 16, and output circuit 17 in Embodiment 1, and so their detailed description is omitted. Although solid-state imaging device 50 includes two output circuits 57, the number of output circuits in the solid-state imaging device is not limited to two. For example, the solid-state imaging device may include four output circuits 17, as in solid-state imaging device 10 in Embodiment 1.

Luminance signal line 58 is connected to luminance image selection transistor 302 in each pixel 500 in the same column. Distance signal line 59 is connected to selection transistor 118 in the same column. Luminance-distance selection switch 60 has one of luminance signal line 58 and distance signal line 59 connected to the output side. In this solid-state imaging device, luminance-distance selection switch 60 has CDS circuit 55 connected to the input side, and one of luminance signal line 58 and distance signal line 59 connected to the output side.

The driving method of solid-state imaging device 50 is described below, with reference to FIG. 12. FIG. 12 illustrates operation periods included in one frame period of solid-state imaging device 50. The one frame period is divided into a background light detection period, a distance measurement period, a distance signal output period, and a luminance image capture and output period. Solid-state imaging device 50 repeats the background light detection period, the distance measurement period, the distance signal output period, and the luminance image capture and output period in this order. Of these, the driving operation in the luminance image capture and output period is the same as that for image capture by a typical solid-state imaging device. In detail, the luminance image of the object can be obtained by obtaining the light reception signal through luminance image amplification transistor 301 and luminance image selection transistor 302. The luminance image capture and output period is a period for acquiring a luminance image of an object (namely, a black-and-white image) or, in the case where pixel 500 includes color filters, acquiring a color image.

In the background light detection period, the same operation is performed in all pixels 500, using the method described in Embodiment 1, 2, or 4.

In the distance measurement period which follows, too, the same operation is performed in all pixels 500, using the method described in Embodiment 1, 2, or 4. At this point, the voltage corresponding to the distance has been stored in storage capacitor 115 in each storage circuit 104.

In the distance signal output period, first, luminance-distance selection switch 60 selects distance signal line 59. Following this, while sequentially selecting the rows by vertical shift register 53 (the scan is performed in the same way as a typical solid-state imaging device), the voltage of storage capacitor 115 in each pixel 500 in each selected row is read to CDS circuit 55. Subsequently, storage node reset transistor 116 is turned on, to reset the voltage applied to storage capacitor 115. After turning off storage node reset transistor 116, the reset voltage of storage capacitor 115 is read to distance signal line 59 through amplification transistor 117, and this voltage is subtracted from the voltage read to CDS circuit 55 previously. As a result, a distance signal can be obtained. While sequentially scanning the columns by horizontal shift register 56, the distance signal is read to the outside through output circuit 57.

In the luminance image capture and output period which follows, luminance-distance selection switch 60 selects luminance signal line 58. In the case of pixel 300 illustrated in FIG. 10A, if the same operation as a typical solid-state imaging device is performed using luminance image amplification transistor 301 and luminance image selection transistor 302, then a luminance signal, i.e. a luminance image (simply referred to as "image" in general) of the object, is obtained.

In the case of pixel 400 illustrated in FIG. 10B, the plurality of transfer gate transistors 406*a*, 406*b*, 406*c*, and 406*d* may operate simultaneously (i.e. the same operation as short-circuiting the gates of the plurality of transfer gate transistors 406*a*, 406*b*, 406*c*, and 406*d*) or separately. Whether the plurality of light receiving circuits 401 operate simultaneously or separately may be determined freely. In the former case, since the number of light receiving circuits can be regarded as one in terms of circuitry, the same holds as in FIG. 10A. In the latter case, the resolution of the luminance image can be increased with respect to the resolution of the distance image, by a factor corresponding to the number of light receiving elements (photodiodes) in the pixel. The structure and driving method of this solid-state imaging device 50 are described below.

Suppose light receiving elements 405*a*, 405*b*, 405*c*, and 405*d* all have the same shape. It is normally considered desirable to array light receiving elements 405*a*, 405*b*, 405*c*, and 405*d* evenly in the area where pixel 400 is located in solid-state imaging device 50. For example, in the case where the number of light receiving elements is four (light receiving elements 405*a*, 405*b*, 405*c*, and 405*d*), an array of two rows and two columns is formed.

The driving method of solid-state imaging device 50 with the above-mentioned structure is described below. The plurality of transfer gate transistors may operate simultaneously in the background light detection period, the distance measurement period, and the distance signal output period, and may operate separately in the luminance image capture and output period. First, suppose luminance image selection transistor 302 in a given row is selected by vertical shift register 53. In this state, one transfer gate transistor, e.g. transfer gate transistor 406*a*, is operated, and the luminance signal and the reset voltage detected by light receiving element 405*a* connected to the transfer gate transistor are read to CDS circuit 55 and subjected to subtraction (this is the same as a typical solid-state imaging device). Horizontal shift register 56 is operated for sequential reading through output circuit 57. After this, another transfer gate transistor, e.g. transfer gate transistor 406*b*, is operated, and the same operation is performed. This is carried out for all transfer gate transistors 406*a*, 406*b*, 406*c*, and 406*d* in pixel 400. Subsequently, the next row is selected by vertical shift register 53, and the same operation is performed. Thus, a luminance image whose resolution is increased with respect to the resolution of the distance image by a factor corresponding to the number of light receiving elements 405*a* in pixel 400 can be obtained.

The operation described here is based on the premise that the light spectrum from the object when obtaining the luminance image includes the wavelength of light from light source 40. It is typically known as desirable to install, in an optical system to solid-state imaging device 50, a bandpass filter for allowing only the wavelength of light from light source 40 to pass through, thus suppressing the influence of background light in distance measurement. In this case, the luminance image is an image corresponding to only the light wavelength of light source 40. If this is not desirable, for example, color filters installed in the solid-state imaging device may be modified, or the pixel according to the present disclosure and a typical pixel may be provided together in the solid-state imaging device.

Embodiment 5

A solid-state imaging device according to Embodiment 5 is described below.

In a pixel included in the solid-state imaging device according to this embodiment, an avalanche photodiode is used as the light receiving element. The pixel may be the pixel illustrated in any of FIGS. 3, 9, 10A, and 10B.

In the case of using an avalanche photodiode as the light receiving element, a high voltage (typically about 10 V to 100 V) is applied across the light receiving element. A typical photodiode generates one electron or hole for one photon incident on the light receiving element. An avalanche photodiode, on the other hand, generates a plurality of electrons or holes for one photon incident on the light receiving element. The number of electrons or holes generated is referred to as "multiplication factor".

For example, in the case of pixel 100 illustrated in FIG. 3, if a typical photodiode is used as light receiving element 105, noise called kTC noise occurs when turning on or off counter transistor 109. The value of kTC noise depends on the capacitance value of charge accumulation capacitor 108 or counter transistor 109. In the case where the capacitance value of charge accumulation capacitor 108 or counter transistor 109 is several fF, the value of kTC noise is several ten electrons. In the case where, relative to the value of kTC noise of several ten electrons, the intensity of received light is weak and the charge generated by light receiving element 105 is about one electron, the received light will end up being buried in kTC noise.

By using an avalanche photodiode with a high multiplication factor as light receiving element 105, a distance signal of a high SN ratio can be obtained without the received light being buried in kTC noise. In particular, in Geiger mode, i.e. in a state where the multiplication factor is about 10000 or more, a binary light reception signal as described in Embodiment 1 can be obtained.

Normally, the avalanche photodiode operates in the same way as the typical photodiode if the applied voltage is decreased (usually several V), and operates in Geiger mode with a high multiplication factor if the applied voltage is increased (usually about several 10 V to 100 V).

In the case of pixel 300 or 400 that can acquire both the distance image and the luminance image as in Embodiment 4, the applied voltage of the avalanche photodiode is increased in the background light detection period and the distance measurement period, and decreased in the luminance image capture and output period. Thus, the operation suitable for obtaining the distance image can be performed in the background light detection period and the distance measurement period, and the same operation as the typical solid-state imaging device can be performed in the luminance image capture and output period to obtain the luminance image.

Embodiment 6

Figure 13:
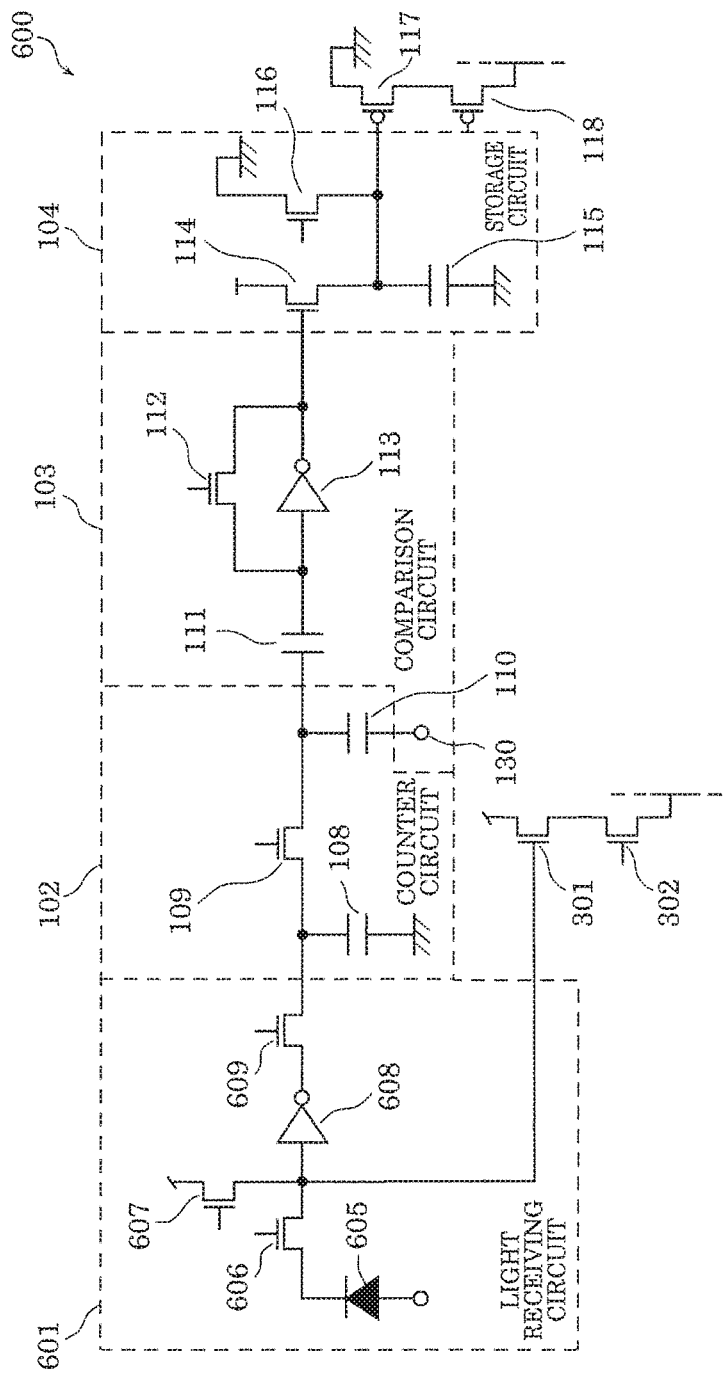
FIG. 13 is a diagram illustrating the structure of a pixel included in a solid-state imaging device according to Embodiment 6.
Figure 14:
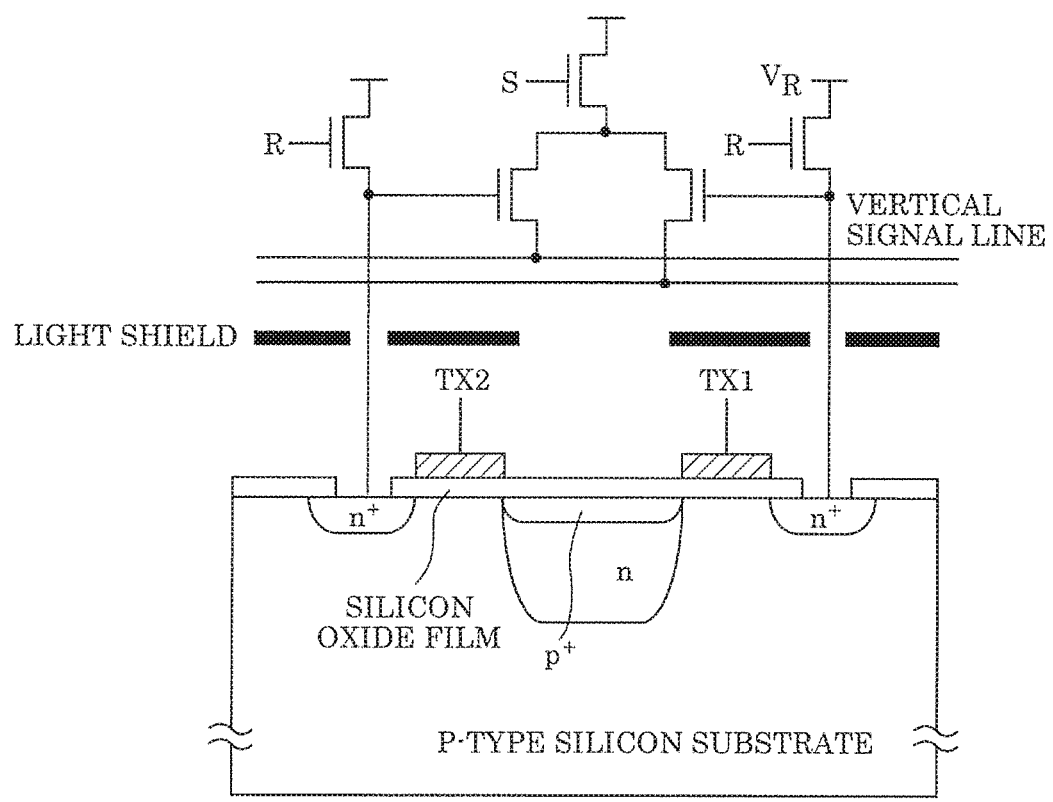
FIG. 14 is a diagram illustrating the pixel structure of a conventional distance image sensor.
Figure 15:
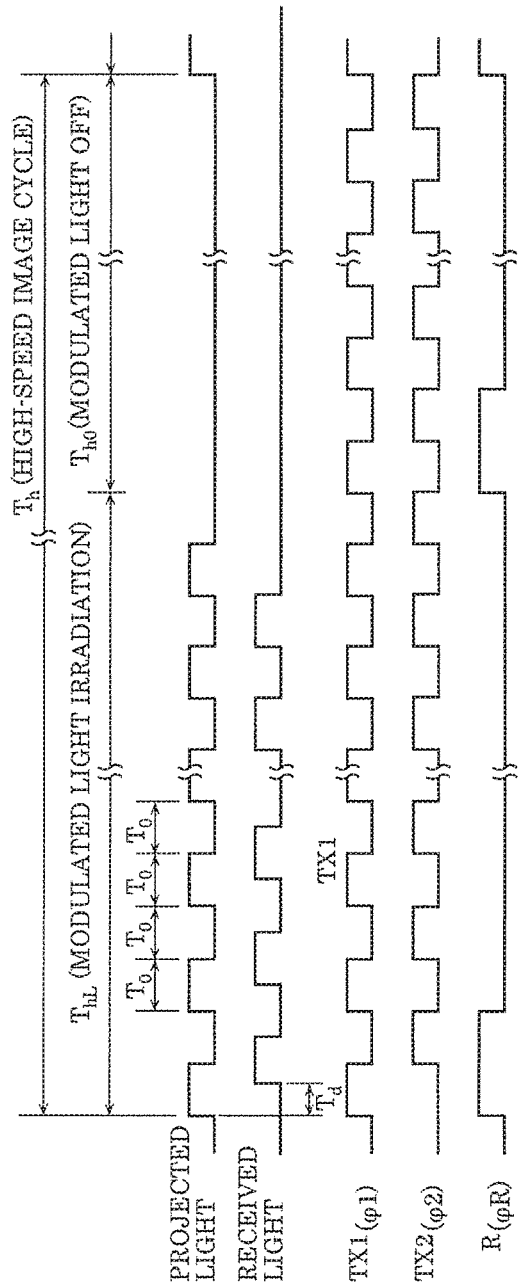
FIG. 15 is a diagram illustrating the operation timings of the conventional distance image sensor.

A solid-state imaging device according to Embodiment 6 is described below, with reference to FIG. 13. FIG. 13 is a diagram illustrating the structure of a pixel included in the solid-state imaging device according to this embodiment.

The solid-state imaging device according to this embodiment differs from the solid-state imaging device according to Embodiment 3 in that the light receiving circuit includes an inverter and a light reception signal switch in addition to a light receiving element and a transfer gate transistor.

As illustrated in FIG. 13, pixel 600 included in the solid-state imaging device according to this embodiment includes light receiving circuit 601, counter circuit 102, comparison circuit 103, and storage circuit 104. The components other than light receiving circuit 601 in pixel 600 illustrated in FIG. 13 are the same as those in pixel 300 illustrated in FIG. 10A, and so their detailed description is omitted.

Light receiving circuit 601 includes light receiving element 605, transfer gate transistor 606, reset transistor 607, light receiving element signal amplification inverter 608, and light reception signal switch 609. The number of pairs of light receiving elements 605 and transfer gate transistors 606 may be one (as illustrated in FIG. 13), or more than one (not illustrated, but same as in FIGS. 10A and 10B).

In light receiving circuit 601, light receiving element signal amplification inverter 608 amplifies the charge generated by light receiving element 605 to a light reception signal with a high amplitude, thus obtaining a binary signal. By turning on light reception signal switch 609 to input this signal to counter circuit 102, a binary light reception signal can be yielded.

While a solid-state imaging device according to one or more aspects has been described above by way of embodiments, the present invention is not limited to such embodiments. Other modifications obtained by applying various changes conceivable by a person skilled in the art to the embodiments and any combinations of the structural elements in different embodiments without departing from the scope of the present invention are also included in the scope of one or more aspects.

For example, the number of pairs of light receiving elements and transfer gate transistors in the light receiving circuit may be one, or more than one.

Moreover, the light receiving circuit may be connected to the luminance image amplification transistor and the luminance image selection transistor.

Moreover, the light receiving circuit may include the light receiving element signal amplification inverter and the light reception signal switch.

Embodiment 7

Figure 16:
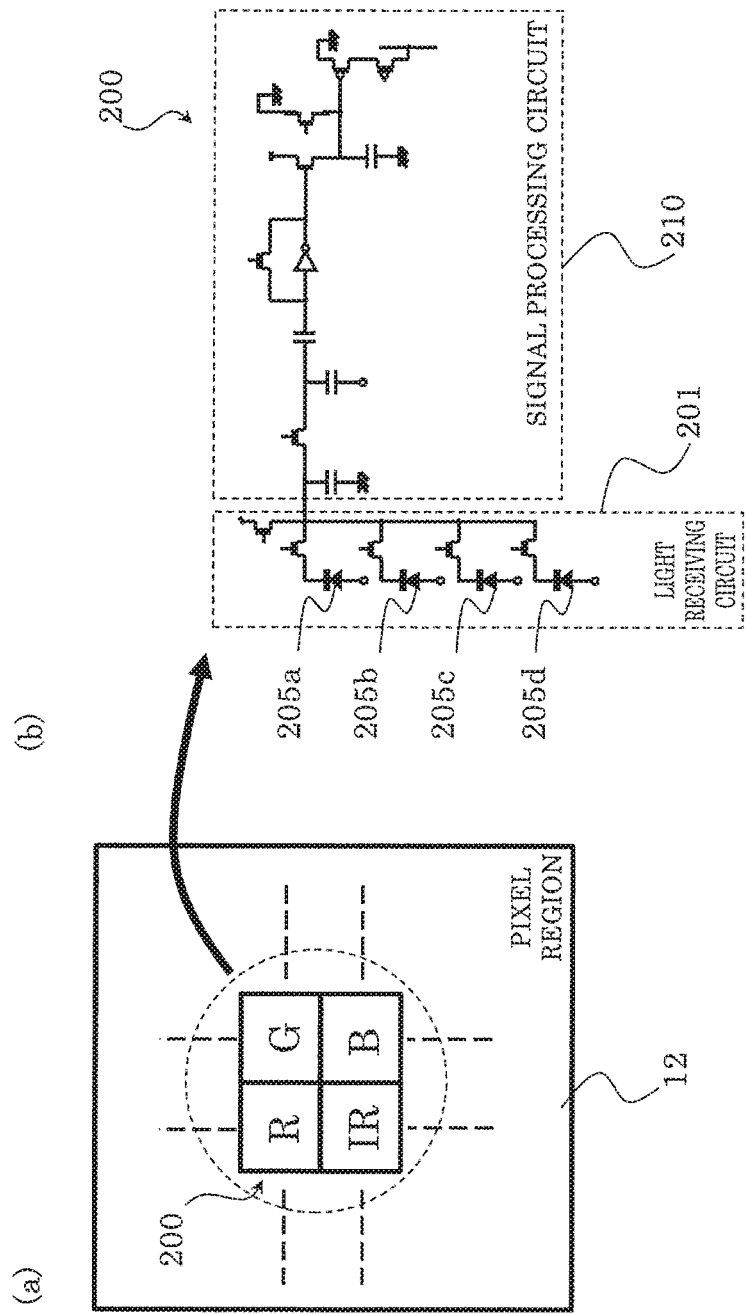
FIG. 16 is a diagram illustrating an array in a pixel region included in a solid-state imaging device according to Embodiment 7.

A solid-state imaging device according to Embodiment 7 is described below, with reference to FIG. 16. FIG. 16 is a diagram illustrating an array in a pixel region included in the solid-state imaging device according to this embodiment.

As illustrated in (a) and (b) in FIG. 16, in the solid-state imaging device according to this embodiment, one pixel 200 includes: light receiving circuit 201 (the same light receiving circuit as light receiving circuit 201 illustrated in FIG. 9) including light receiving elements 205a, 205b, 205c, and 205d (each element for receiving visible light is hereafter also referred to as "visible light receiving element"); and signal processing circuit 210 (circuit including the same structure as counter circuit 102, comparison circuit 103, storage circuit 104, amplification transistor 117, and selection transistor 118 illustrated in FIG. 9).

The structures and operations of light receiving circuit 201 and signal processing circuit 210 are the same as the structures and operations of light receiving circuit 201, counter circuit 102, comparison circuit 103, storage circuit 104, amplification transistor 117, and selection transistor 118 illustrated in FIG. 9, and so the description is made using the reference marks in FIG. 9. In this embodiment, a plurality of pixels 200 in pixel region 12 include a first pixel group including an infrared transmission filter and a second pixel group including a visible light transmission filter.

In (a) in FIG. 16, light receiving elements 205a, 205b, 205c, and 205d corresponding to red (R), blue (B), green (G), and infrared (IR) constitute one set, and are arrayed two-dimensionally. One pixel circuit 200 illustrated in FIG.

9 is provided in the area of one set. A total of four light receiving elements, i.e. light receiving elements 205a, 205b, 205c, and 205d mentioned above, are provided, which respectively correspond to R, G, B, and IR. Light receiving element 205a provided at the position of R includes a red transmission filter located on the light receiving surface, and receives only red light. Light receiving element 205c provided at the position of B includes a blue transmission filter located on the light receiving surface, and receives only blue light. Light receiving element 205b provided at the position of G includes a green transmission filter located on the light receiving surface, and receives only green light. Light receiving element 205d provided at the position of IR includes an infrared transmission filter located on the light receiving surface, and receives only infrared light.

With this structure, a color image can be formed by obtaining a luminance image using each of light receiving elements 205a, 205b, and 205c corresponding to R, B, and G. A distance image can be obtained using infrared rays as light source 40 and using light receiving element 205d corresponding to IR.

The driving method may be the same as the method described in Embodiment 3. Here, in the case of obtaining a luminance image, only transfer gate transistor 206a connected to light receiving elements 205a, 205b, and 205c corresponding to R, B, and G is driven. In the case of obtaining a distance image, only transfer gate transistor 406 connected to light receiving element 205d corresponding to IR is driven.

Although a set of one light receiving element 205a, one light receiving element 205b, one light receiving element 205c, and one light receiving element 205d for detecting R, B, G, and IR is arrayed in this example, an array in which the number of light receiving elements 205a, 205b, 205c, or 205d is more than one may also be used. For example, four light receiving elements 205d corresponding to IR may be provided together with one light receiving element 205a, one light receiving element 205b, and one light receiving element 205c corresponding to R, B, and G. The same circuitry can be used for other combinations.

Embodiment 8

Figure 17:
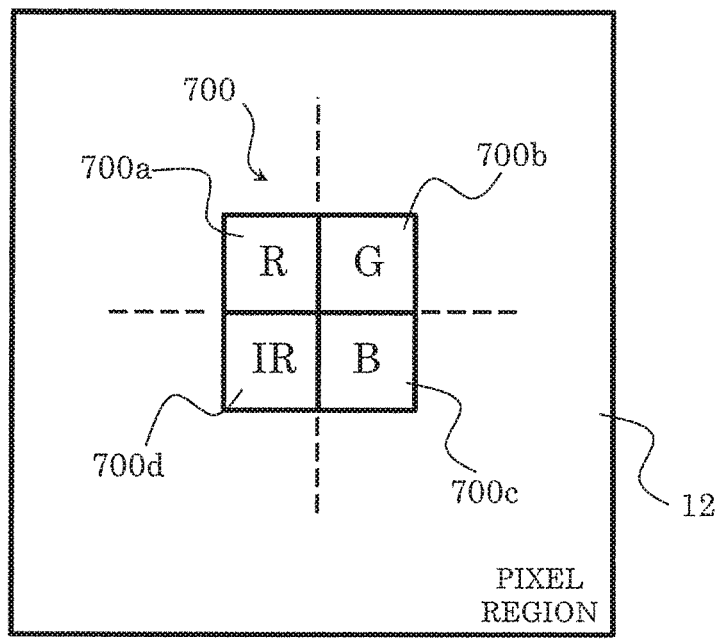
FIG. 17 is a diagram illustrating an array in a pixel region included in a solid-state imaging device according to Embodiment 8.
Figure 18:
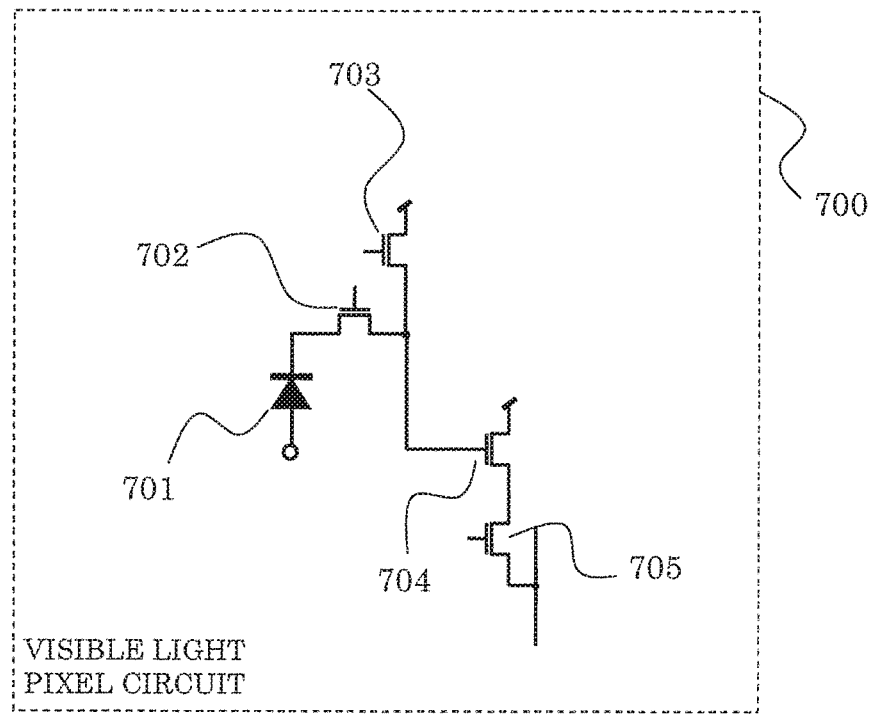
FIG. 18 is a circuit diagram illustrating the structure of a visible light pixel circuit according to Embodiment 8.

A solid-state imaging device according to Embodiment 8 is described below, with reference to FIGS. 17 and 18. FIG. 17 is a diagram illustrating an array in a pixel region included in the solid-state imaging device according to this embodiment. In FIG. 17, the inside of the square is the same as that in FIG. 16. FIG. 18 is a circuit diagram illustrating the structure of a visible light pixel circuit according to this embodiment.

In FIG. 17, red (R), blue (B), green (G), and infrared (IR) constitute one set, and pixels including light receiving circuits 700a, 700b, 700c, and 700d corresponding to red (R), blue (B), green (G), and infrared (IR) are arrayed two-dimensionally. Light receiving circuit 700d having the same structure as light receiving circuit 101 illustrated in FIG. 3 or 10A is provided at the position of IR. Light receiving circuits 700a, 700b, and 700c are provided at the positions of R, B, and, G. Light receiving circuits 700a, 700b, and 700c have the same structure as visible light pixel circuit 700 illustrated in FIG. 18. Visible light pixel circuit 700 is described below.

Visible light pixel circuit 700 illustrated in FIG. 18 has the same structure as light receiving circuit 101, luminance image amplification transistor 301, and luminance image selection transistor 302 illustrated in FIG. 10A. In detail, visible light pixel circuit 700 includes light receiving element 701 with a visible light (e.g. red light, blue light, green light) transmission filter located on the light receiving surface, transfer gate transistor 702, reset transistor 703, luminance image amplification transistor 704, and luminance image selection transistor 705. The structure of visible light pixel circuit 700 is the same as the structure of a pixel circuit in a typical CMOS sensor, and so the description of the driving method is omitted.

With this structure, a color image can be formed by obtaining a luminance image using each of light receiving elements 701 corresponding to R, B, and G, as in Embodiment 7. A distance image can be obtained using infrared rays as light source 40 and using light receiving element 701 corresponding to IR. In the case of using visible light pixel circuit 700 illustrated in FIG. 18 at the position of IR, a luminance image using infrared light can also be obtained.

The method of arraying R, B, G, and IR is not limited to the above and may be modified as appropriate, as in Embodiment 7.

Embodiment 9

Figure 19:
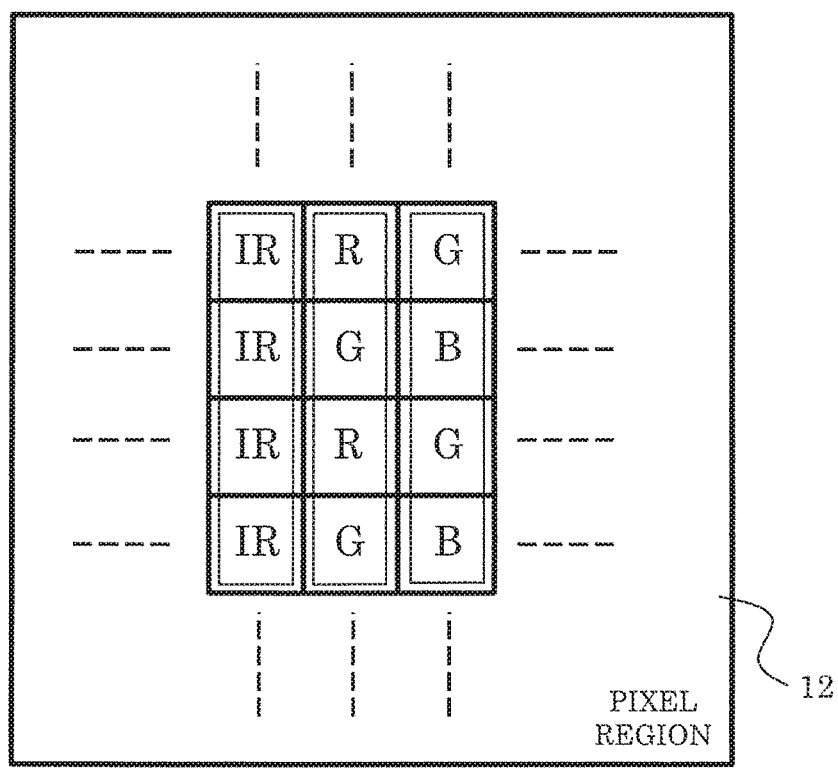
FIG. 19 is a diagram illustrating an array in a pixel region included in a solid-state imaging device according to Embodiment 9.
Figure 20:
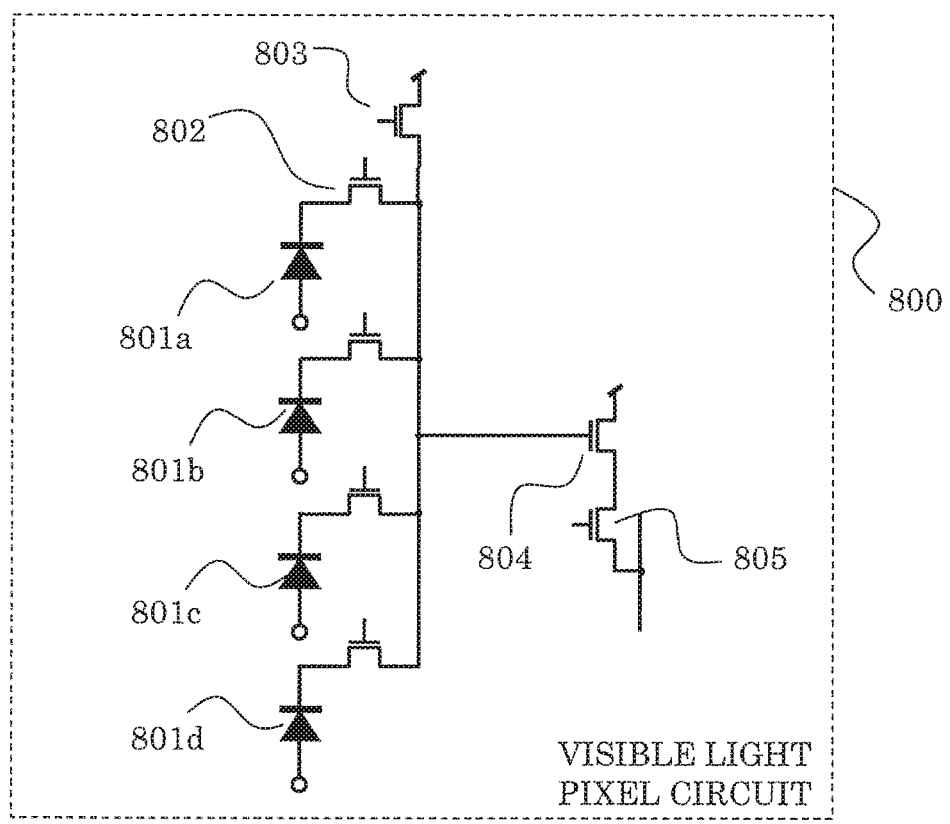
FIG. 20 is a circuit diagram illustrating the structure of a visible light pixel circuit according to Embodiment 9.

A solid-state imaging device according to Embodiment 9 is described below, with reference to FIGS. 19 and 20. FIG. 19 is a diagram illustrating an array in a pixel region included in the solid-state imaging device according to this embodiment. In FIG. 19, the inside of the square is the same as that in FIG. 16 or 17. FIG. 20 is a circuit diagram illustrating the structure of a visible light pixel circuit according to this embodiment.

As illustrated in FIG. 19, four pixels IR arrayed in the column direction each include one light receiving element. An infrared transmission filter is located on the light receiving surface of the light receiving element, and only infrared light is detected by the light receiving element. This pixel area corresponding to four pixels includes the pixel circuit illustrated in FIG. 9 or 10A. This pixel circuit has the same structure as pixel circuit 101 or 201 illustrated in FIG. 9 or 10A.

In the right adjacent pixel column, R, G, R, G are arranged from above, where light receiving elements 801a, 801b, 801c, and 801d (see FIG. 20) respectively with red, green, red, and green transmission filters located on the light receiving surface are provided. This pixel area corresponding to four pixels includes visible light pixel circuit 800 illustrated in FIG. 20 (note that light receiving elements 801a, 801b, 801c, and 801d illustrated in FIG. 20 include a visible light receiving element).

Visible light pixel circuit 800 illustrated in FIG. 20 includes light receiving elements 801a, 801b, 801c, and 801d, transfer gate transistor 802, reset transistor 803, luminance image amplification transistor 804, and luminance image selection transistor 805. Visible light pixel circuit 800 has the same structure as light receiving circuit 101 or 201, luminance image amplification transistor 301, and luminance image selection transistor 302 illustrated in FIG. 9 or 10A. Visible light pixel circuit 800 is a circuit often used in a typical CMOS image sensor, and so the description of the driving method is omitted.

A color luminance image can be obtained by using the respective light receiving elements corresponding to R, G, and B from among light receiving elements 801a, 801b, 801c, and 801d and driving visible light pixel circuit 800 illustrated in FIG. 20.

A distance image can be obtained by driving the part including light receiving circuit 101 or 201 illustrated in FIG. 9 or 10A. In the case of using light receiving circuit 101 illustrated in FIG. 10A, an infrared luminance image can also be obtained.

In this embodiment, a pixel in which an infrared transmission filter is located and that includes a light receiving element corresponding to IR corresponds to the first pixel group, and a pixel in which a visible light (e.g. red light, blue light, green light) transmission filter is located and that includes a light receiving element corresponding to any of R, G, and B corresponds to the second pixel group.

With such a pixel array, at least two pixels adjacent in the second pixel group have a common reset transistor and a common amplification transistor connected to their respective transfer gate transistors. This can reduce the area of reset transistors and amplification transistors and increase the area of the second pixel group, with it being possible to improve the accuracy of the distance image. To increase the accuracy of the distance image, the area of the first pixel group including the infrared transmission filter is desirably greater than 25% of the whole area of pixel region 12.

The pixel array according to this embodiment is not limited to the array illustrated in FIG. 19. Other arrays may also be used by appropriately increasing or decreasing the number of sets of light receiving elements and transfer gates in the circuit illustrated in FIG. 9, 10A, or 20 (four sets are illustrated in FIGS. 9, 10A, and 20 as an example).

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

A solid-state imaging device according to the present invention is applicable to vehicle equipment for collision avoidance or autonomous driving, a distance measurement device, and the like.

What is claimed is:

1. A solid-state imaging device comprising:
a plurality of pixels in a two-dimensional array, the plurality of pixels including a first pixel group that includes an infrared transmission filter, wherein each pixel in the first pixel group includes:
   a light receiving circuit that includes a light receiving element for performing photoelectric conversion of converting received light into an electrical signal, sets, by an exposure signal, a photoelectric time for performing the photoelectric conversion in the light receiving element, and outputs a light reception signal depending on whether or not incident light has reached the pixel within the photoelectric time;
   a counter circuit that counts, as a count value, the number of times the incident light has reached the pixel, based on the light reception signal received from the light receiving circuit;
   a comparison circuit that sets a value corresponding to the count value as a threshold, when a threshold setting signal is on, and, when the threshold setting signal is off, the comparison circuit sets a comparison signal to an on state in the case where the count value is greater than the threshold; and
   a storage circuit that receives the comparison signal and a time signal changing with time, and stores, as a distance signal, the time signal when the comparison signal is in the on state.

2. The solid-state imaging device according to claim 1, wherein the solid-state imaging device measures a distance to an object based on a time for pulse light from a light source to return, and outputs a distance image representing the distance to the object in one frame period,
the one frame period includes a background light detection period, a distance measurement period, and a distance signal output period,
the threshold is set in the background light detection period,
the distance measurement period is divided into N periods, where N is an integer greater than or equal to 1,
the exposure signal is set with a delay of a predetermined time with respect to an emission time of the light pulse from the light source, in each of the background light detection period, the distance measurement period, and the distance signal output period,
the count value is compared with the threshold in each of the N periods in the distance measurement period, and the time signal is stored as the distance signal in each period in which the count value is greater than the threshold, and
the distance signal is output as the distance image in the distance signal output period.

3. The solid-state imaging device according to claim 1, wherein the light receiving circuit includes a transfer gate transistor that transfers a charge generated by the photoelectric conversion, and
the transfer gate transistor is connected between the light receiving element and the counter circuit.

4. The solid-state imaging device according to claim 3, wherein the light receiving circuit includes a plurality of pairs each made up of the light receiving element and the transfer gate transistor connected in series.

5. The solid-state imaging device according to claim 2, wherein
the light receiving circuit is further connected to a luminance image amplification transistor comprised in the pixel, and the luminance image amplification transistor is connected to a luminance image selection transistor also comprised in the pixel, and
the solid-state imaging device: obtains the distance signal to obtain the distance image; and further obtains the light reception signal through the luminance image amplification transistor and the luminance image selection transistor, during a luminance image capture and output period to obtain a two-dimensional luminance image of the object.

6. The solid-state imaging device according to claim 4, wherein
the transfer gate transistor in each of the plurality of pairs is connected to the counter circuit,
the solid-state imaging device outputs both a luminance image and a distance image in one frame period,
the one frame period includes a background light detection period, a distance measurement period, a distance signal output period, and a luminance image capture and output period, and
respective transfer gate transistors in the plurality of pairs operate simultaneously in the background light detection period, the distance measurement period, and the distance signal output period, and operate separately in the luminance image capture and output period.

7. The solid-state imaging device according to claim 1, wherein the light receiving element is an avalanche photodiode.

8. The solid-state imaging device according to claim 1, wherein the light receiving circuit includes a light receiving element signal amplification inverter and a light reception signal switch.

9. The solid-state imaging device according to claim 1, wherein the plurality of pixels further include a second pixel group that includes a visible light transmission filter.

10. A distance measurement device comprising:
the solid-state imaging device according to claim 1;
a light source; and
a signal processing device that controls the solid-state imaging device synchronously with control of the light source,
wherein the solid-state imaging device receives reflected light generated as a result of light emitted from the light source being reflected by an object, and the signal processing device outputs a distance image from the light source to the object based on an emission time of the light pulse from the light source and a time at which the solid-state imaging device receives the reflected light.

11. The solid-state imaging device according to claim 9, wherein each pixel in the second pixel group includes:
a visible light receiving element;
a transfer gate transistor connected to the visible light receiving element;
a reset transistor connected to the transfer gate transistor; and
an amplification transistor connected to the transfer gate transistor.

12. The solid-state imaging device according to claim 11, wherein at least two pixels adjacent in the second pixel group each include:

a visible light receiving element; and
a transfer gate transistor connected to the visible light receiving element, and
the at least two pixels include a common reset transistor and a common amplification transistor that are connected to the transfer gate transistor included in each of the at least two pixels.

13. A distance measurement method for measuring a distance based on a time for pulse light from a light source to be reflected by an object and return, and outputting a distance image in one frame period,
wherein the one frame period includes a background light detection period, a distance measurement period, and a distance signal output period,
a threshold is set in the background light detection period,
the distance measurement period is divided into N periods, where N is an integer greater than or equal to 1,
an exposure signal is set with a delay of a predetermined time with respect to an emission time of the light pulse from the light source, in each of the background light detection period, the distance measurement period, and the distance signal output period,
a count value is compared with the threshold in each of the N periods in the distance measurement period, and a time signal is stored as a distance signal in each period in which the count value is greater than the threshold, and
the distance signal is output as the distance image in the distance signal output period.

14. The distance measurement method according to claim 13,
wherein the one frame period further includes a luminance image capture and output period for obtaining a luminance image of the object, and
a light reception signal obtained from the object is output as the luminance image, in the luminance image capture and output period.

* * * * *